United States Patent
Li et al.

(10) Patent No.: US 9,976,011 B2
(45) Date of Patent: May 22, 2018

(54) POLYMER COMPOSITES AND FABRICATIONS THEREOF

(75) Inventors: Hao Li, Columbia, MO (US); Qingson Yu, Columbia, MO (US); Liang Chen, Columbia, MO (US); Meng Chen, Columbia, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 362 days.

(21) Appl. No.: 13/183,221

(22) Filed: Jul. 14, 2011

(65) Prior Publication Data

US 2012/0129970 A1 May 24, 2012

Related U.S. Application Data

(60) Provisional application No. 61/399,580, filed on Jul. 14, 2010.

(51) Int. Cl.
*C08K 7/08* (2006.01)

(52) U.S. Cl.
CPC .......... *C08K 7/08* (2013.01); *C08K 2201/011* (2013.01); *C08K 2201/016* (2013.01)

(58) Field of Classification Search
CPC ...... C08K 7/08; C08K 2201/011; C08K 3/32; C08K 3/0033; C08K 2003/325; C08K 2201/016
USPC ...... 522/82; 524/417, 140, 405, 413, 29, 35, 524/21, 22; 523/300, 113, 116, 115; 264/328.1; 977/783, 919, 904
See application file for complete search history.

(56) References Cited

U.S. PATENT DOCUMENTS

| | | | |
|---|---|---|---|
| 7,067,577 B2 | 6/2006 | Aramaki | |
| 7,758,882 B2 | 7/2010 | Roeder | |
| 7,897,248 B2 | 3/2011 | Barrera | |
| 8,552,087 B2 | 10/2013 | Zappini | |
| 2002/0193463 A1 | 12/2002 | Jones et al. | |
| 2003/0031698 A1 | 2/2003 | Roeder | |
| 2004/0034141 A1* | 2/2004 | Aramaki | C08K 3/32 524/415 |
| 2006/0047052 A1 | 3/2006 | Barrera | |
| 2006/0204738 A1* | 9/2006 | Dubrow et al. | 428/292.1 |

(Continued)

FOREIGN PATENT DOCUMENTS

| | | |
|---|---|---|
| CN | 101489518 A | 7/2009 |
| EP | 1588 724 A2 | 10/2005 |

(Continued)

OTHER PUBLICATIONS

Fong. Electrospun nylon 6 nanofiber reinforced BIS-GMA/TEGDMA dental restorative composite resins. Polymer, 2004;45:2427-2432.

(Continued)

*Primary Examiner* — Michael A Salvitti
(74) *Attorney, Agent, or Firm* — Polsinelli PC

(57) ABSTRACT

The present invention provides polymer composites reinforced with high aspect ratio reinforcing fillers selected from calcium phosphate nanofibers, nanoplates, submicron fibers, submicron plates, and combinations thereof. The mechanical and biological properties of the inventive composites are enhanced significantly over current polymer composites and may be employed in various biomedical applications, such as dental restorations.

11 Claims, 21 Drawing Sheets
(7 of 21 Drawing Sheet(s) Filed in Color)

(56) References Cited

U.S. PATENT DOCUMENTS

| | | | |
|---|---|---|---|
| 2007/0015110 A1 | 1/2007 | Zhang | |
| 2009/0060961 A1* | 3/2009 | Naruse et al. | 424/401 |
| 2009/0104386 A1 | 4/2009 | Barrera | |
| 2009/0258965 A1* | 10/2009 | Lassila | A61K 6/0023 523/116 |
| 2010/0068679 A1* | 3/2010 | Zappini | A61K 6/0044 433/225 |
| 2010/0121463 A1* | 5/2010 | Tormala | A61L 27/446 623/23.75 |

FOREIGN PATENT DOCUMENTS

| | | |
|---|---|---|
| JP | H04-361757 A | 12/1992 |
| JP | 2001-019605 A | 2/2001 |
| WO | 1997-020521 | 6/1997 |
| WO | 2003-047645 A1 | 12/2003 |
| WO | 2008/000917 A1 | 1/2008 |
| WO | 2008-118943 A1 | 10/2008 |

OTHER PUBLICATIONS

Tian M, Gao Y, Liu Y, Liao Y, Hedin NE, Fong H. Fabrication and evaluation of Bis-GMA/TEGDMA dental resins/composites containing nano fibrillar silicate. Dent Mater, 2008;24:235-243.

Mitra SB, Wu D, Holmes BN. An application of nanotechnology in advanced dental materials. J Am Dent Assoc, 2003;134:1382-1390.

Arcis et al. Mechanical properties of visible light-cured resins reinforced with hydroxyapatite for dental restoration. Dent. Mater, 2002;18:49-57.

Domingo et al. Hydrolytic stability of experimental hydroxyapatite-filled dental composite materials. Dent Mater, 2003;19:478-486.

Skritic. Effect of bifunctional comonomers on mechanical strength and water sorption of amorphous calcium phosphate- and silanized glass-filled Bis-GMA-based composites. Biomaterials, 2003;24:2881-2888.

Hockin et al. Effects of Incorporating Nanosized Calcium Phosphate Particles on Properties of Whisker-Reinforced Dental Composites. J Biomed Mater Res (Appl Biomater), 2007;81B:116-125.

Xu et al. Nano DCPA-whisker composites with high strength and Ca and PO(4) release. J Dent Res, 2006;85:722-727.

Aryal et al. Biomimetic hydroxyapatite particulate nanofiber modified silicon: In vitro bioactivity, Journal of Biomedical Materials Feb. 27, 2008.

Translation received from foreign associate on Nov. 17, 2014 of First Office Action dated Sep. 12, 2014 in related Chinese application No. 201180043350.0, 59 pages.

Translation received from foreign associate on Apr. 3, 2014 of Office Action dated Mar. 3, 2015 in related Japanese application No. 2013-519833, 5 pages [English counterparts of cited references are also reported herein.].

Feb. 24, 2015 Letter from foreign associate regarding Third Party Observations submitted on Feb. 24, 2015 and Mar. 9, 2015 Letter from foreign associate with a listing of documents submitted by the Third Party, 5 pages.

Chen et al., "Synthesis and study of calcium phosphate nanowires in microemulson", Journal of Chemical Industry and Engineering (China), 2005, pp. 942-946, vol. 56, No. 5.

Second Office Action from related Chinese Patent Application No. 201180043350.0, dated May 18, 2015; 34 pgs.

Cao et al., "Preparation of Ultrahigh-Aspect-Ratio Hydroxyapatite Nanofibers in Reverse Micelles under Hydrothermal Conditions," Langmuir, 2004, vol. 20 pp. 4784-4786.

Office Action dated Nov. 17, 2015 related to Japanese Application No. 2013-519833, 4 pages.

Office Action dated Nov. 24, 2015 related to Chinese Application No. 201180043350.0, 21 pages.

Japanese Office Action related to Application No. 2013519833, dated May 10, 2016, 3 pages.

Zhang et al., "Synthesis of Nanospherical and Ultralong Fibrous Hydroxyapatite and Reinforcement of Biodegradable Chitosan/Hydroxyapatite Composite," Modem Physics Letters, 2009, pp. 24, vol. 23, No. 31 & 32.

Kim, Nanofiber Generation of Hydroxyapatite and Fluor-Hydroxyapatite Bioceramics, Published online Nov. 8, 2005 in Wiley InterScience, 6 pgs.

Chinese Decision on Rejection related to Application No. 201180043350, dated Jun. 12, 2016 with 31 pages.

Chinese Reexamination Notice related to Application No. 201180043350.0, dated Feb. 24, 2017; 33 pgs.

Chinese Reexamination Decision related to Application No. 201180043350.0, dated Jul. 28, 2017; 36 pgs.

* cited by examiner

A

B

A

B

POLYMER COMPOSITES AND FABRICATIONS THEREOF

GRANT STATEMENT

This invention was made with government support under 1R21DE018821-01A2 from the National Institute of Health and CMMI-0846744 from the National Science Foundation. The government has certain rights in the invention.

FIELD OF THE INVENTION

The present invention generally relates to polymer composites, including a polymer matrix and reinforcing fillers selected from nanofibers, nanoplates, submicron fibers, submicron plates, and combinations thereof, as well as modified reinforcing fillers. The mechanical properties, biological properties, and/or durability of the polymer composites described within are significantly enhanced over current polymer composites and are suitable to be employed in various applications.

BACKGROUND OF THE INVENTION

Polymer composites have been used in a variety of fields, such as dental restoration and orthopedic implants. Natural biological structures, such as tooth, bone, and shell are composites of nanoscale or submicroscale hard inorganic building blocks (minerals) and soft organic matters (proteins). Metals, however, are the dominant implant materials in medical markets due to the availability of metals and their mechanical properties. Orthopedic metal implants, however, create significant concerns. Metal implants often need to be removed, and even those that are not removed may cause adverse effects such as formation of excess scar tissue, infection, weakened bone, and immune sensitivity. Synthetic ceramics, polymers, and their composites may provide better biological properties but their applications have been hampered by inadequate mechanical properties. For example, the compressive and/or tensile strength of hydroxyapatite-collagen (HA/Col) composites are typically much lower than cortical bone and metals.

In dental applications, amalgam provides a median survival lifespan of 13 years. Resin-based composites typically have a median survival lifetime of 5-7 years because of inadequate mechanical properties and poor bonding to tooth material. Still, polymers are preferred due to aesthetic and safety concerns with amalgam.

To improve the properties of synthetic polymer composites, fillers have been added to these materials. For example, some polymer composites have been reinforced with nanowhiskers. Some dental composites have used silica or silicate nanoparticles as fillers, and some orthopedic in-situ and ex-situ composites have been reinforced with hydroxyapatite, either in the form of short nanofibers and nanowhiskers. However, the mechanical properties of the composites reinforced by nanoparticles, short nanofibers, or nanowhiskers show limited improvement in mechanical properties such as strength and toughness and may not be sufficient to meet the requirements of various applications.

Therefore, there is a need to provide a new and improved synthetic composite with enhanced mechanical properties sufficient for biomedical applications.

SUMMARY OF THE INVENTION

The present invention relates to an improved synthetic polymer composite comprising a polymer matrix and a reinforcing filler. The reinforcing filler can be of a variety of materials as long as it is has a high aspect ratio. Fillers are selected from selected from nanofibers, nanoplates, submicron fibers, submicron plates, and combinations thereof, as well as modified reinforcing fillers. The reinforcing fillers can be calcium phosphates, which are minerals comprising calcium ions ($Ca^{2+}$) and a phosphate ion or phosphate ions, such as orthophosphates ($PO_4^{3-}$), metaphosphates ($PO_3^{-}$), or pyrophosphates ($P_2O_7^{4-}$). The polymers comprising the polymer matrix may be those known and available in the field of biomedical and dental polymers or may be synthesized. The polymers can be of a variety of materials, examples include poly(L-lactide), polyetheretherketone, 2,2-bis[4-(2-hydroxy-3-methacryloyloxypropyl)phenyl] propane(Bis-GMA), and triethylene glycol dimethacrylate.

The nanofiber, nanoplate, submicron fiber, or submicron plate reinforcing fillers are characterized by a high aspect ratio. The diameter or the thickness of the reinforcing fillers is preferably between about 10 nanometers and about 1 micrometer. The aspect ratios of the reinforcing fillers range from about 10 to about 10,000.

In yet another embodiment herein described, a method for fabricating polymer composites is described. The method comprises mixing a polymer matrix and a reinforcing filler. The method may further comprise a modification step or steps. Modification may be either chemical or mechanical, and may be provided on a polymer, the polymer matrix, the reinforcing fillers, or the polymer composite. Moreover, methods of using the polymer composites are also described. The polymer composites may be used in orthopedic and dental applications.

The polymer composites described within show improved mechanical properties over prior art composites. The polymer composites described within show improved mechanical properties over prior art composites, which includes but are not limited to strength, stiffness, toughness, as well as biological properties. Some embodiments show fiber bridging, elongation, and fiber pull-out which are important reinforcing mechanisms to improve the strength and toughness of the materials.

REFERENCE TO COLOR FIGURES

The application file contains at least one photograph executed in color. Copies of this patent application and publication with color photographs will be provided by the Office by request and payment of the necessary fee.

BRIEF DESCRIPTION OF DRAWINGS

FIGS. 1(a) and (b) are schematic depictions of composite with diameter or thickness in the nanometer or sub-micrometer scale. FIG. 1(a) shows random fillers in a polymer and FIG. 1(b) shows fillers oriented in one direction.

DETAILED DESCRIPTION OF THE INVENTION

Figure 1:
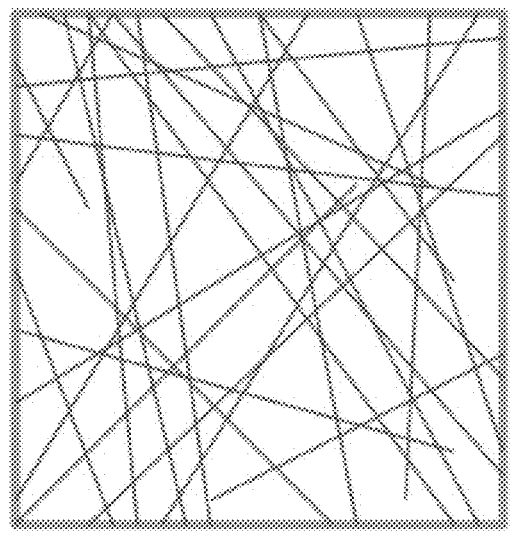
Figure 1:
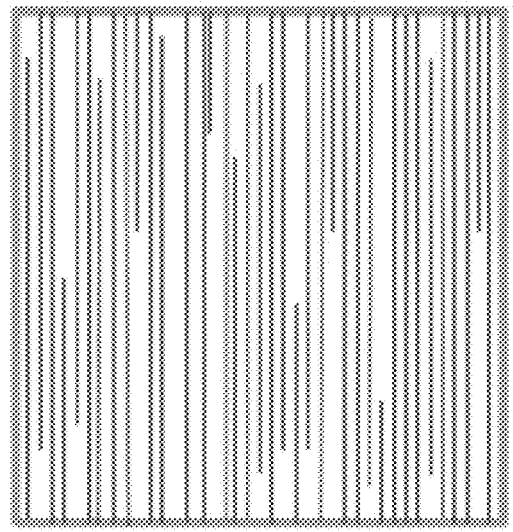

The present invention provides a synthetic polymer composite comprising a polymer matrix and an amount of reinforcing filler selected from nanofibers, nanoplates, submicron fibers, submicron plates and combinations thereof, as well as modified fillers. The high aspect-ratio nano-sized or submicron-sized fibers/plates provide advantages over short fibers and whiskers by providing higher load transfer properties, higher mechanical strength, higher toughness, and resistance to catastrophic failures. Moreover, these properties may be enhanced through modification. Methods for fabricating and using the polymer composites are also described. In addition, the methods show improved biocompatibility over polymer matrix and polymer composite containing nanoparticles.

I. Polymer Composites

Polymer composites, as used herein, refers to the product of the addition of the reinforcing filler selected from nanofibers, nanoplates, submicron fibers, submicron plates and combinations thereof to a polymer matrix. Polymer composite is additionally meant to refer to such product when additional ingredients are incorporated into the polymer matrix or the reinforcing filler. Polymer composite may refer to the cured or dried product as well as the wet mixtures.

a. Polymer Matrix

The polymer matrix may comprise one or more polymers, as well as, additional reagents incorporated in the polymerization of various polymers such as initiators, catalysts, solvents, and the like. Polymers are macromolecules of an individual monomer or monomers. The polymer matrix may comprise a single polymer or more than one polymer.

The polymers incorporated in the matrix may be synthesized or selected from a variety of commercially available polymers. Polymers may include orthopedic polymers or dental polymers. Non-limiting examples of exemplary orthopedic polymers include poly(glycolide) PGA, poly(L-lactide) (PLA), poly(DL-lactide) (DLPLA), poly(dioxanone) (PDO), poly(lactide-co-glycolide) (PLGA), poly(glycolide-co-trimethylene carbonate) (PGA-TMC), poly(e-caprolactone) (PCL), poly(amino acids), polyanhydrides, polyorthoesters, polyetheretherketone (PEEK), polyethylene (PE), collagen, chitosan, gelatin, alginate, poly(methyl methacrylate) (PMMA), polyhydroxyalkanoates (PHAs), polyurathanes (PURs), polyphosphazenes, poly(propylene fumarate) (PPF), poly(1,4-butylene succinate) (PBSu), and poly($\alpha$-hydroxyacids). Non-limiting examples of exemplary dental polymers include 2,2-bis[4-(2-hydroxy-3-methacryloyloxypropyl)phenyl]propane(Bis-GMA), ethoxylated bisphenol-A-dimethacrylate (Bis-EMA), 1,6-bis-[2-methacryloyloxyethoxycarbonylamino]-2,4,4-trimethylhexane (UDMA), triethylene glycol dimethacrylate (TEGDMA), urethane tetramethyacrylate, siloxane, 4-epoxycyclohexylmethyl-(3,4-epoxy)cyclohexane (ERL4221), silsesquioxane (SSQ), and the like.

Polymers may also be synthesized from monomers. A single monomer or a mixture of monomers may be selected for the desired polymer. Monomers include, but are not limited to, glycolide, L-lactide, DL-lactide, dioxanone, trimethylene carbonate, e-caprolactone, amino acids, anhydrides, orthoesters, etheretherketone, ethylene, methyl methacrylate, hydroxyalkanoates, urathanes, phosphazenes, propylene fumarate 1,4-butylene succinate, $\alpha$-hydroxyacids, and the like.

The polymer matrix may include a single polymer or a number of polymers. In some embodiments, the polymer matrix will have only a single polymer, whereas other embodiments may require mixtures of two or more polymers to give the most advantageous properties for the particular application. In embodiments where there are two or more polymers, the polymers may likely be combined in any ratio without limitation. In some embodiments, the polymers may be present in the polymer matrix in a about equal amounts, and in other embodiments, the amounts of each polymer may vary from about 1 to about 99% of the matrix. For example, in a polymer matrix comprising two polymers, the amount of each polymer may be about 50%, or alternatively one polymer could be about 75%, or about 90% of the composite. In a polymer matrix comprising more than two polymers, the polymers can be provided in about equal ratios, or with an excess of one or more of the polymers.

b. Reinforcing Fillers

Suitable reinforcing fillers are selected from nanofibers, nanoplates, submicron fibers, submicron plates, and combinations thereof as well as modified fillers, and may be synthesized or purchased when commercially available. The reinforcing fillers may be characterized as nanofibers, nanoplates, submicron fibers, or submicron plates. The reinforcing fillers will, on average, be of the size and diameter characterizing nanofibers, nanoplates, submicron fibers, or submicron plates. Nanofiber and submicron fiber fillers are generally fiber shaped and can be characterized by a diameter and a length. The cross-section of a fiber could be round, oval, triangle, rectangle, square, pentagon, hexagon, or the like with the larger diameter/side with similar size to the smaller diameter/side. Nanofibers have a diameter of less than 100 nm. Submicron fibers have a diameter of over 100 nm and less than 1 micron. Nanoplate and submicron plates are characterized by a cross section of rectangle (not square), oval (not round), or the like shape with the larger diameter/side (width) much larger than the smaller diameter/side (thickness). Plates can be characterized by the length of their longest side, the width of the cross section of the larger side, and the thickness of the plate as the shortest dimension of the plate. Submicron plates have a thickness of over 100 nm and less than 1 micron. Nanoplates have a thickness less than 100 nm. More preferably, the diameter and thickness of the fillers is between about 10 nm and about 1 micrometer. The length of the fibers and plates can and will vary. In some embodiments the length will be about 100 to about 900 times the thickness or diameter. In other embodiments, the length will be 50,000 times the diameter.

The reinforcing fillers are also characterized by a high aspect ratio. The aspect ratio characterizes the longest dimension of a given object over its shortest dimension. A high aspect ratio, as used herein, is an aspect ratio above about 10. For fibers, the aspect ratio is the length divided by the diameter, and for plates the aspect ratio is the length divided by the plate thickness. It should be understood that each nanofiber, nanoplate, submicron fiber, or submicron plate need not be within a particular aspect ratio, but rather, the reinforcing filler may be characterized by a high aspect ratio when the components of the reinforcing fillers, on average, have a high aspect ratio. The reinforcing fillers have an average aspect ratio above about 10. In other embodiments, the reinforcing fillers range between about 1000 and about 50,000. In other embodiments, the average aspect ratio ranges between about 100 to about 500, or between about 400 to about 900, or between about 800 to about 10,000. As would be appreciated by a person skilled in the art, bundled fillers would have a lower aspect ratio if the diameter or thickness of the entire bundle was used as the shortest dimension.

The reinforcing fillers can be of a single strand, bundles, or mixtures of strands and bundles. In some embodiments, the reinforcing fillers are bundled and the thickness of the bundle is on average less than about 5 micrometers on average, or less than about 4 micrometers on average, or less than about 3 micrometers on average, or less than about 2 micrometers on average. In other embodiments, the reinforcing fillers are substantially single strand. The reinforcing fillers may be in any orientation. The reinforcing fillers may be randomly dispersed in the polymer matrix or substantially oriented in a single direction. Some orientations may improve strength, stiffness, toughness, damping, wear resistance, and other properties.

The reinforcing fillers comprise various calcium phosphates. Calcium phosphates are the primary mineral phase in tooth and bone and can be used to improve the biocompatibility of a polymer composite. Moreover, calcium phosphates have been shown to impede dental caries (or tooth decay) due to their ability to generate calcium ions. Calcium phosphates, as used herein, comprise calcium ions ($Ca^{2+}$) together with one or more phosphate containing ions. Phosphate ions include phosphate containing molecules including orthophosphates ($PO_4^{3-}$), metaphosphates ($PO_3^{-}$), and pyrophosphates ($P_2O_7^{4-}$). Calcium phosphates may further comprise one or more additional anions. Non-limiting examples include hydroxide ions ($OH^-$), carbonate ions ($CO_3^{2-}$), fluorine ions ($F^-$), chlorine ions ($Cl^-$) sulfate ions ($SO_4^{2-}$), and combinations thereof. The calcium phosphates may also contain one or more cations including, by way of non-limiting example, hydrogen ions ($H^+$), sodium ions ($Na^+$), potassium ions ($K^+$), magnesium ions ($Mg^{2+}$), silver ions ($Ag^+$), and combinations thereof. The calcium phosphates may be further stabilized by an anion ($X^-$), preferably, ($OH^-$), ($CO_3^{2-}$), ($F^-$), ($Cl^-$), or mixtures thereof. Hydroxyapatite (HA) is the compound of the formula $Ca_5(PO_4)_3X$ where $X^-$ is substantially ($OH^-$). Other examples of suitable reinforcing fillers include tricalcium phosphate $Ca_3(PO_4)_3$, including amorphous, $\alpha$ and $\beta$ phase; tetracalcium phosphate $Ca_4(PO_4)_2O$; monocalcium phosphate $Ca(H_2PO_4)_2$; monocalcium phosphate monohydrate $Ca(H_2PO_4)_2 \cdot H_2O$; anhydrous calcium hydrogen phosphate $CaHPO_4$, DCPA, Monetite; carbonated hydroxyapatite, $Ca_{10}(PO_4)_6(CO_3)_x(OH)_{2-2x}$, where x ranges from 0 to 1, CHA; dicalcium phosphate dihydrate $CaHPO_4 \cdot 2H_2O$, Brushite;

ocatacalcium phosphate $Ca_8(HPO_4)(PO_4)_5(OH)$; calcium-deficient hydroxyapatite $Ca_9(HPO_4)(PO_4)_5OH$, CDHA; and the like.

In some aspects of the invention, the reinforcing filler further comprises a gelatin-like coating on the surface of the fillers. The gelatin coat is a likely result of the synthesis of the reinforcing fillers. The coating has been found to contain both amine and carboxylic acid moieties. These moieties may be charged or uncharged depending on the pH.

Modification of the polymer composites, the polymer matrix, or reinforcing fillers may enhance certain properties of the resulting polymer composite. Some modifications may provide improved dispersion or promote mechanisms such as enhanced fiber bridging or fiber pull-out, which increase the strength of the composites. Moreover, modifications may decrease shrinkage of the resulting polymer composite, decrease the water absorption of the polymer composite, or improve the thermal stability of the polymer composite. Modifications may be chemical or mechanical.

Chemical modifications result in attachment of different moieties to the surface of the reinforcing filler. Depending on the polymer composite, different chemical modifications on the surface of the reinforcing filler may be possible. For example, amine surface moieties may be desired when epoxy, collagen, chitosan, and gelatin are used as the polymer matrices. Carboxylic acid and hydroxyl moieties may be useful for polymer composites when collagen, chitosan, gelatin are used as the polymer matrices. Alkyl groups on the filler surfaces may be helpful in improving dispersion in nonpolar polymers.

Reinforcing fillers may be modified by carboxylic acids. The resulting surface moiety may comprise the formula $-NH(CR_1R_2)_nCOOH$, where $R_1$ and $R_2$ are independently chosen from hydrogen, hydrocarbyl, or substituted hydrocarbyl, and n is an integer between 1 and 20. In Reaction Scheme 1 below, glycolic acid is the carboxylic acid reagent, and the resulting reinforcing filler comprises a surface of $-NH(CR_1R_2)_nCOOH$ moieties, where $R_1$ and $R_2$ are hydrogen, and n is 1. In other embodiments, the resulting reinforcing filler may comprise a surface of $-NHCOR_8$ moieties, where $R_8$ is chosen from hydrogen, hydrocarbyl, and substituted hydrocarbyl. The carboxylic acid moieties of the modified polymers may exist as ions or as neutral groups depending on the pH.

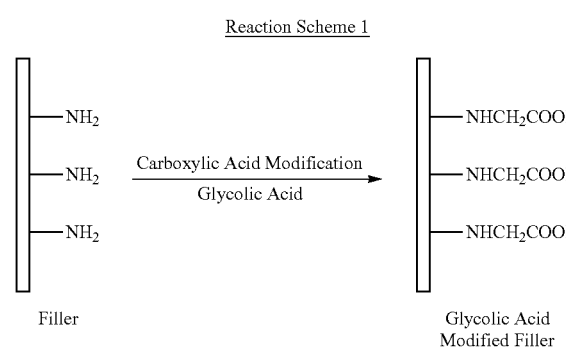

Reaction Scheme 1

Filler — Glycolic Acid Modified Filler

The reinforcing fillers may also be modified by amine reagents. Amine reagents may react with various groups on the filler. In some embodiments, the amine reagent reacts with the carboxylic acid moieties on the surface of the reinforcing filler. The resulting substitution on the carboxylic acid may be a $-CONR_3R_4$ moiety, as shown in Reaction Scheme 2, wherein $R_3$ and $R_4$ are independently chosen from hydrogen, hydrocarbyl, or substituted hydrocarbyl groups. Reaction with an amine gas may result in various amine functionalities, including charged species, on the surface of the reinforcing filler.

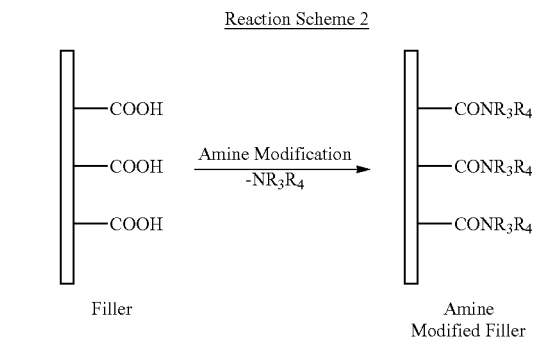

Reaction Scheme 2

Filler — Amine Modified Filler

The reinforcing fillers may also comprise silane surface modifications. Silanes may react with hydroxyl moieties on the surface of the reinforcing filler. The hydroxyl moieties may be from the gelatin-like composition on the surface of the reinforcing filler or from hydroxyl moieties of the calcium phosphate. Silanes covalently bond the oxygen atoms on the filler. One silane molecule can bond with from one to three hydroxyl moieties on the reinforcing filler, depending on the substitution of the Si atom of the silane. Where the Si atom is substituted with leaving groups, the leaving groups may be replaced by a bond to hydroxyl groups on the reinforcing filler. In some embodiments, silanes have a formula of $SiR_5(LG)_3$, where $R_5$ is independently chosen from hydrogen, hydrocarbyl, or substituted hydrocarbyl, LG is a leaving group selected from hydroxy, alkoxy, or halogen, and the resulting silane modified reinforcing filler may have up to three bonds to the hydroxyl group of the filler as shown in Reaction Scheme 3.

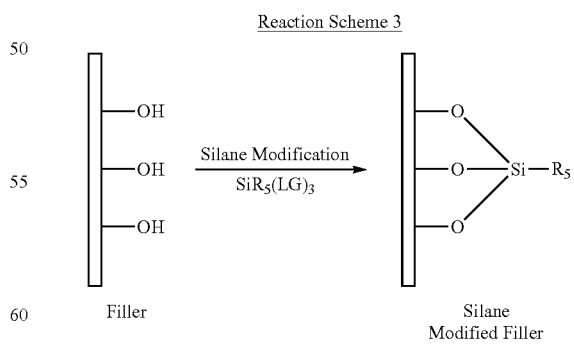

Reaction Scheme 3

Filler — Silane Modified Filler

In alternate embodiments, the silane may bond with one hydroxyl or two hydroxyl groups to form the surface modifications shown below.

Reaction Scheme 4

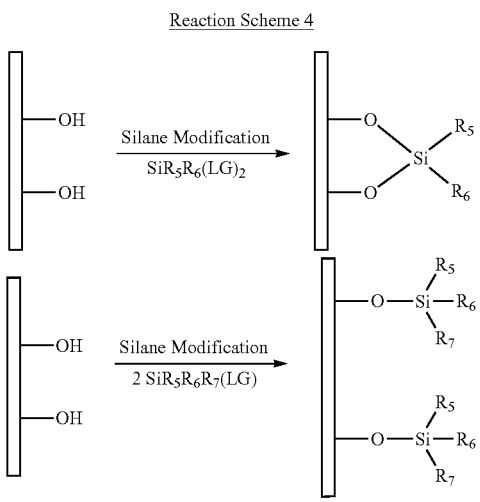

A further modification of the surface may be alkylation. Alkylation may be provided on various moieties of the reinforcing filler. Alkylation of an amine moiety results in an alkyl amine moiety —$NHR_9$, where $R_9$ is hydrocarbyl or substituted hydrocarbyl. Alkylation of a carboxylic acid may result in an alkyl ester —$COOR_{10}$ as the surface modification, where $R_{10}$ is a hydrocarbyl or substituted hydrocarbyl. Further modifications include perioxidation, where a peroxide may be incorporated in on the surface of the reinforcing filler.

Figure 16:
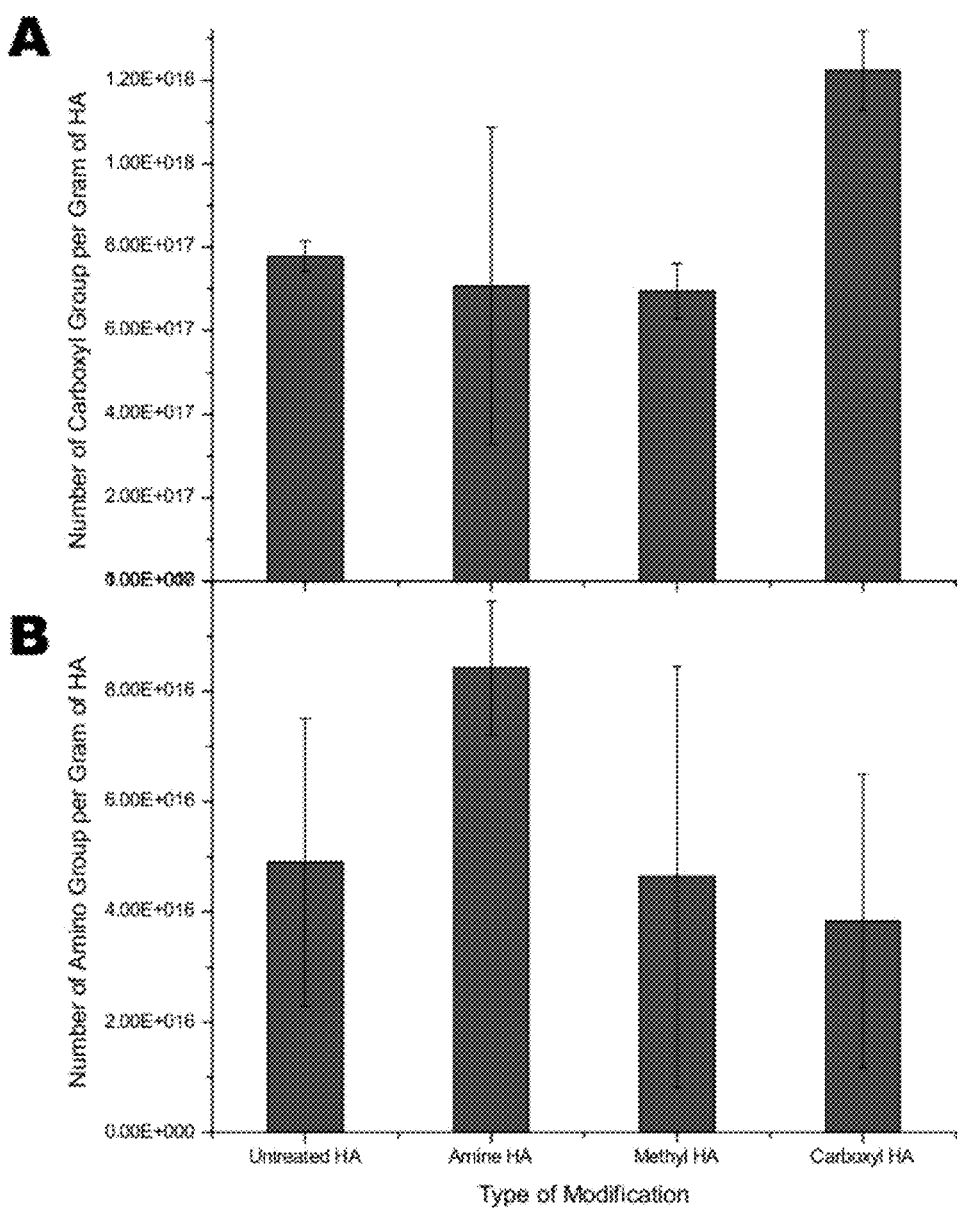
FIG. 16 shows the results of titration for the functional moieties of reinforcing fillers. It shows the number of surface functional moieties per gram of HA reinforcing fillers after the surface modification with 12-aminododecanoic acid, dodecanoic acid, and dodecanedioic acid.

The level of modification on the reinforcing filler may vary depending on the application. In some embodiments, the reinforcing filler may be modified to the extent that the modifying reagent forms an outer layer of the filler. In other embodiments, the modifications may be more disperse, leaving gelatin-like coating or the reinforcing filler surface as the outermost layer in some areas. Titration of the functional groups is shown in FIG. 16 and shows the number of surface functionalities on a polymer composite after modification with various reagents.

The high aspect ratio reinforcing fillers show high levels of biocompatibility. Biocompatibility is a measure of a material's suitability for biological uses and is important for applications in the medical and dental fields. Biocompatible materials are non-toxic, provoke little or no immune response when placed in a biological system, and do not cause high levels of cell death in the surrounding tissues. The biocompatibility of the polymer composites described herein has been tested by MTT analysis, which showed a high level of biocompatibility compared to other fillers.

c. Compositions

The polymer composites comprise the polymer matrix and the reinforcing fillers. The reinforcing fillers may be of a single type or a mixture of reinforcing fillers. The reinforcing fillers may be present in a range of weight percentages of the polymer composite, also called loading rate. The loading rates may vary widely in different polymer matrices. The stiffness of a polymer composite generally increases with the loading rate, however, there also exists a point at which additional loading causes decreases in the mechanical properties of the polymer composite. In some embodiments, the amount ranges from about 0.5 and 80 wt % of the polymer composite. In alternate embodiments, the amount of reinforcing filler may range from about 1 and 50 wt % of the polymer composite. In yet another embodiment, the amount of filler ranges from about 20 wt % to about 60 wt %, and in yet another aspect of the invention the amount of filler ranges from about 3 wt % to about 15 wt %.

The composites may also contain additional fillers. Additional fillers may provide additional mechanical properties to the polymer composites. Additional fillers can be any acceptable filler known in the art. The additional fillers can also be polymer phase, such as calcium phosphates, strontium glass, barium glass, quartz, borosilicate glass, ceramics, silica, silicon nitride, silicon carbide, zirconia, medical grade ceramics, poly(L-lactide), poly(e-caprolactone), poly(lactide-co-glycolide), chitosan, cellulose, collagen, gelatin, chitosan, cellulose, collagen, gelatin, and other medical polymers. The additional filler may be of various shapes, such as particle, rod, or fiber. The additional fillers may be of various sizes in the nanometer, submicrometer and micrometer scales.

The additional fillers may be of various sizes in the nanometer, submicrometer and micrometer scales. The amount of additional filler present in the composite may vary widely deepening on the application. In some embodiments, the amount of additional filler may range from 0 and 80 wt % of the polymer composite. In an alternate embodiment, the additional filler may range between about 50 and about 70 wt % of the polymer composite. In a preferred embodiment, the amount of additional filler may be about 60 wt % of the polymer composite.

The polymer composites or the individual components may additionally be mechanically modified through a variety of methods described in Part II. Mechanical modifications can provide better dispersion of various ingredients of the polymer composite. In particular, mechanical modifications can provide better dispersion of the reinforcing filler through the polymer matrix as seen in both Scanning Electron Microscopy and Transmission Electron Microscopy.

In some embodiments, the mixed polymer composites may be a highly viscous liquid. The polymer composites are transformed in to solids through the process of curing or molding. Cured or molded polymer composites have the advantageous properties of biocompatibility, strength and water absorption described herein.

The polymer composites described may additionally show high levels of biaxial flexural strength, bending strength, tensile strength, elongation, etc. Strength is a measure of a material's ability to resist deformation under stress. The polymer composites provide advantageous mechanical properties over the same the polymers without fillers. In one embodiment, adding high aspect ratio calcium phosphate fillers improves the biaxial strength of polymers in an amount ranging from about 2% improvement to about 100% improvement.

II. Method of Fabricating Polymer Composites

A further aspect of the invention provides a method of fabricating the polymer composites. The method comprises mixing a high aspect ratio reinforcing filler selected from nanofiber, nanoplate, submicron fiber, submicron plate, and combinations thereof, in a polymer matrix. The method may further comprise various modifications.

a. Polymer Matrix

The polymer matrix may be provided either as a commercially available polymer, mixture of polymers, or may be synthesized.

Synthesis of polymers can be performed by any method known in the art. Acceptable monomers include, but are not limited to monomers listed in Part I(a). Polymer synthesis may require use of a solvent and/or an acceptable catalyst or initiator. Polymerization solvents include any solvent acceptable for the polymerization reaction including acetone, alcohols, chloroform, 1,2-dichloroethane, dioxane, ethyl acetate, hexanes, methyl ethyl ketone, water and mixtures thereof. Non-limiting examples of suitable polymerization initiators include ketones, peroxides, amino and vinylic initiators or catalysts. Specific examples of initiators or catalysts include, but are not limited to, camphorquinone (CQ), phenylpropanedione, lucirin, ethyl-4-dimethylaminobenzoate (E4), 2,2'-azobis(2-methylpropionitrile), benzoyl peroxide, and the like. Catalysts and initiators can be added in any ratio sufficient to give polymerization. Typically, initiators or catalysts are provided to the reaction in 1-10 wt % to the weight of the polymer.

The matrix may also comprise a mixture of two or more polymers. Polymers may be mixed by any method including through manual mixing, grinding, sonication, and the like. A solvent may be used to facilitate the mixing by temporarily reducing the viscosity of the polymers. Preferably, the solvent will be evaporated off of the polymer and not included in the polymer matrix in any substantial amount.

Mechanical modifications may be provided to the polymers or polymer matrices, as described below in Part II(c).

b. Reinforcing Fillers

Reinforcing fillers may be purchased or synthesized. Synthesis of the unmodified calcium phosphate reinforcing fillers can be accomplished by any method known in the art. By way of example, hydroxyapatite reinforcing fillers are synthesized by combining a calcium nitrate with phosphate salt in the presence of gelatin and urea and heating at a temperature of about 60° C. to about 100° C. for 1-5 days. In a preferred embodiment, calcium nitrate is $(Ca(NO_3)_2)$, sodium dihydrogen phosphate $(NaH_2PO_4)$, gelatin, and urea are dissolved in water and the concentrations of calcium nitrate $(Ca(NO_3)_2)$, sodium dihydrogen phosphate $(NaH_2PO_4)$, gelatin, and urea are respectively, 0.02 mol/L (mol/liter), 0.02 mol/L, 0.2 g/L (gram/liter), and 0.04 mol/L. The solution may be mixed, then heated to 95° C. and held at 95° C. for 72 hours. The concentration of the reagents can influence the formation of the fillers.

The reinforcing fillers may also be chemically modified. Chemical modifications can be achieved through wet chemistry methods as well as through plasma treatment. Using wet chemistry to modify the reinforcing fillers, the modification reagent is added to a dilute solution of the reinforcing filler. A solvent may be provided in about 100 to about 1000 wt % to the weight of the reinforcing fillers. The reinforcing fillers are generally dispersed in the solvent prior to the addition of the modification reagent.

The amount of modification reagent added to the reaction depends on the type of modification being performed, the method of performing the modification, and the reinforcing filler being modified. The amount of modification agent provided can range from about 5 wt % to about 300 wt % to the amount of reinforcing filler. The amount of time needed for the modification reaction may also vary widely. The modification reactions may take place over a period of 10 minutes to 2 days.

In some embodiments, the chemical modification is facilitated by plasma treatment. Plasma treatment can be performed in a number of ways and be within the scope of the invention. A typical plasma treatment may be performed by placing the reinforcing filler in glass reactor under vacuum. The reactor provides a stream of flow gas as well as a source of high energy plasma. Plasma facilitates the reaction between gaseous reactants and the reinforcing filler to achieve a modification on the surface via reactions of the gasses. Various volatile reagents may be used to impart the desired functionality. For plasma treatment, gaseous reagents may be provided with an inert gas to lower the concentration of the gaseous reagent gas.

Modification reagents for both the wet chemical method and the plasma chemistry method are chosen from amines, alkyl groups, carboxylic acids, peroxides, and silanes. Exemplary amine reagents are ammonia and alkyl amines. Exemplary carboxylic acid reagents are acrylic acid, citric acid, 12-aminododecanoic acid, dodecanoic acid, dodecanedioic acid glycolic acid, gyloxylic acid, lactic acid, methacrylic acid, and the like. Exemplary silane reagents include 3-methacryloxypropyltrimethoxy silane (3-MPS) and hexamethyldisiloxane (HMDSO), trimethoxysilyl)propylamine, 3-aminopropyltriethoxylsilane, 4-aminobutyltriethoxysilane, 3-aminopropyltri(methoxyethoxy-ethoxy)silane, and diamine functional silanes such as N-(2-aminoethyl)-3-aminopropyltrimethoxysilane and N-(2-aminoethyl)-3-aminopropyltriethoxysilane. Further exemplary reagents include methane, carbon dioxide, $O_2$, and unsaturated and saturated hydrocarbons where the number of carbon atoms ranges from 1 to 20. Gaseous or volatile reagents are suitable for plasma chemistry, while liquid reagents are suitable for wet chemistry.

Chemical modifications may also require the addition of various additional reagents to facilitate the reaction. For example, the modification may be performed with additional reagents to facilitate the reaction such as catalysts, scavengers, or acids or bases. For example, the acrylic acid modification is known to be facilitated by a catalyst present in about 1-10 wt % of the reinforcing filler. An exemplary catalyst for the reaction is sodium cyanoborohydride.

Mechanical modifications may be provided to the reinforcing fillers as described below in Part II(c).

c. Mixing

The method comprises mixing the reinforcing fillers in the polymer matrix to give the polymer composite. Mixing may be provided to either liquid polymers or to dry polymers. Mixing may be provided by any acceptable means including through manual and automated methods. Mixing may additionally be facilitated by a mechanical modification method described herein.

The mixing step may additionally comprise a solvent. The solvent can provide increased mixing by temporarily reducing the viscosity of the materials. The solvent can be chosen from a number of acceptable solvents including acetone, alcohols, chloroform, 1,2-dichloroethane, dioxane, ethyl acetate, hexanes, methyl ethyl ketone, water, and mixtures thereof. Preferably, the solvent evaporates out of the composition such that the solvent is not incorporated into the final composite in any substantial amount. The amount of solvent used can vary depending on the desired viscosity from about 1 wt % of the polymer composite to about 50 wt % of the polymer composite.

d. Additional Steps

The process may further comprise an additional step or steps including mechanical modifications and/or curing.

Mechanical modification may further enhance the mixing to achieve the desired dispersion or bundle size. Mechanical modifications may be provided to the reinforcing fillers, polymer matrix, or the polymer composite. Examples of methods of mechanical modifications are sonication, melt mixing, milling, and the like.

Sonication involves the application of sound to agitate a sample. Sonication may increase the dispersion of reinforcing fillers in the polymer matrix and may also reduce the level of bundling in the reinforcing fillers. Sonication may be performed by a commercial sonicator, through the use of an ultrasonic horn, or any means available. The amount of time that a reinforcing filler, polymer matrix, or a mixture should be subjected to sonication depends on the dispersion level or size of the bundles desired. Longer sonication times result in more dispersion and smaller bundles. In one embodiment, sonication is provided for a length of time ranging between 20 minutes and 2 days. In another embodiment, sonication is provided for a length of time ranging between 1 hour and 10 hours. In a preferred embodiment, sonication is provided for 6 hours.

Melt mixing may also be used to facilitate dispersion. Melt mixing may be achieved by mixing the dry polymers of the matrix with dry reinforcing fillers. Melt mixing may also be achieved using a compounder or a micro-compounder. Rotation speeds and residence times can be varied to optimal conditions and be within the scope of the invention.

The method may also comprise a milling step, which both mixes reinforcing fillers and the polymer matrix, and increases the dispersion of the reinforcing fillers in the polymer matrix. Various commercial millers are available and milling can also be accomplished manually by providing force while mixing the polymer matrix and the fillers. Milling can be provided in various granulation sizes and at various speeds and be within the scope of the invention.

The method may further comprise a curing step. The polymer composites may be cured by any method known in the art including, but not limited to, the addition of chemical curing additives, UV radiation, light, electron beam, heat, or through exposure to ambient conditions.

The method may comprise hot pressing. In this process, the polymer composites are raised to elevated temperatures and then held at high pressure to form composites. The method may additionally comprise injection molding and/or machining. In this process, the polymer composites are molded using an injection molding machine. The composites may be formed into different shapes depending on the application.

The composites may further be machined, such as using a lathe machine, to have a particular shape for various applications.

III. Method of Using Polymer Composites

In a further embodiment, the polymer composites described herein may be used in dental applications and biomedical applications.

Polymer composites may be used as a dental restorative material. Tooth restoration may be needed to provide reinforcement to a tooth that is structurally damaged. In the case of damage caused by decay, the decayed portion of the tooth is first removed, which may cause further structural damage. The polymer composite is then used to fill the area removed or missing due to the decay or damage. The polymer composite has the effect of both sealing the decayed region from further decay and/or reinforcing the structure of the tooth.

The polymer composites described herein can be applied in a similar manner to other dental fillings. Polymer composites are provided in their wet (soft) state to the surface of the tooth being restored. The polymer composite may be applied using normal dental equipment such as forceps. The polymer composite may be shaped to fit the particular purpose either while wet by removing or shaping the wet polymer composite or after the polymer composite has been cured through polishing and shaping.

The polymer composites described herein can be applied to make other dental components, such as composite based crown and veneers, and then applied.

Polymer composites may also be used in orthopedic applications. Orthopedic uses of polymer composites aim to remedy weaknesses of the bone structure. In some applications, the polymer composite may be shaped into internal bone fixation devices such as bone screws, plates, pins, and rods that guide healing or provide reinforcement to the structure of the bone. Fixation devices are formed by hot pressing and injection molding. The polymer composites shaped into a fixation device may be placed in the structure of the bone by either open or closed surgery depending on the application.

In some aspects of the invention, the fixation devices are intended to be permanent, and in other aspects of the invention, the polymer composite fixation device degrades over time.

As another example of orthopedic applications, the polymer composites may be applied in to bone in a wet or partially cured (soft) format, such as in the form of bone cements. The wet or soft composite material may be used for bone support and for reinforcing an internal fixation device.

Definitions

As used herein alkyl means hydrocarbyl or substituted hydrocarbyl, which may be cyclic or straight chain. Unless otherwise indicated, these moieties preferably comprise 1 to 20 carbon atoms.

As used herein calcium phosphates comprise calcium ions ($Ca^{2+}$) together with one or more phosphate containing ions. Phosphate ions include phosphate containing molecules including orthophosphates ($PO_4^{3-}$), metaphosphates ($PO_3^{-}$), and pyrophosphates ($P_2O_7^{4-}$). Calcium phosphates may further comprise one or more additional anions. Non-limiting examples include hydroxide ions ($OH^-$), carbonate ions ($CO_3^{2-}$), fluorine ions ($F^-$), chlorine ions ($Cl^-$) sulfate ions ($SO_4^{2-}$), and combinations thereof. The calcium phosphates may also contain one or more cations including, by way of non-limiting example, hydrogen ions ($H^+$), sodium ions ($Na^+$), potassium ions ($K^+$), magnesium ions ($Mg^{2+}$), silver ions ($Ag^+$), and combinations thereof. The calcium phosphates may be further stabilized by an anion ($X^-$), preferably, ($OH^-$), ($CO_3^{2-}$), ($F^-$), ($Cl^-$), or mixtures thereof.

As used herein hydrocarbyl means organic compounds or ions consisting exclusively of the elements of carbon and hydrogen. These moieties include alkyl, alkenyl, alkynyl, and aryl moieties. They may be cyclic or straight chain. Unless otherwise indicated, these moieties preferably comprise 1 to 20 carbon atoms.

As used herein substituted hydrocarbyl means hydrocarbyl moieties that are substituted with at least one other atom other than carbon and hydrogen. These atoms may be nitrogen, oxygen, silicon, sulfur, phosphorous, boron, or a halogen. They may be cyclic or straight chain. Unless otherwise indicated, these moieties preferably comprise 1 to 20 carbon atoms.

As used herein nanofiber means a fiber with a diameter of less than 100 nm.

As used herein nanoparticle means a plate where all three dimensions of the particle are smaller than 100 nm.

As used herein nanoplate means a plate where the thickness of the plate less than 100 nm.

Nanowhisker, as used herein, means whiskers with diameter is smaller than 100 nm and also characterized by a small aspect ratio, typically smaller than 5.

As used herein submicron fiber means a fiber with a diameter over 100 nm but less than 1 μm.

As used herein submicron plate means a plate where the thickness of the plate is over 100 nm but less than 1 μm.

As used herein silica is a material substantially comprised of silica oxides SiOx where X is any integer.

EXAMPLES

The following examples are included to demonstrate preferred embodiments of the invention. It should be appreciated by those of skill in the art that the techniques disclosed in the examples represent techniques discovered by the inventors to function well in the practice of the invention. Those of skill in the art should, however, in light of the present disclosure, appreciate that many changes can be made in the specific embodiments that are disclosed and still obtain a like or similar result without departing from the spirit and scope of the invention, therefore all matter set forth is to be interpreted as illustrative and not in a limiting sense.

Example 1. Hydroxyapatite (HA) Nanofiber Synthesis

Figure 2:
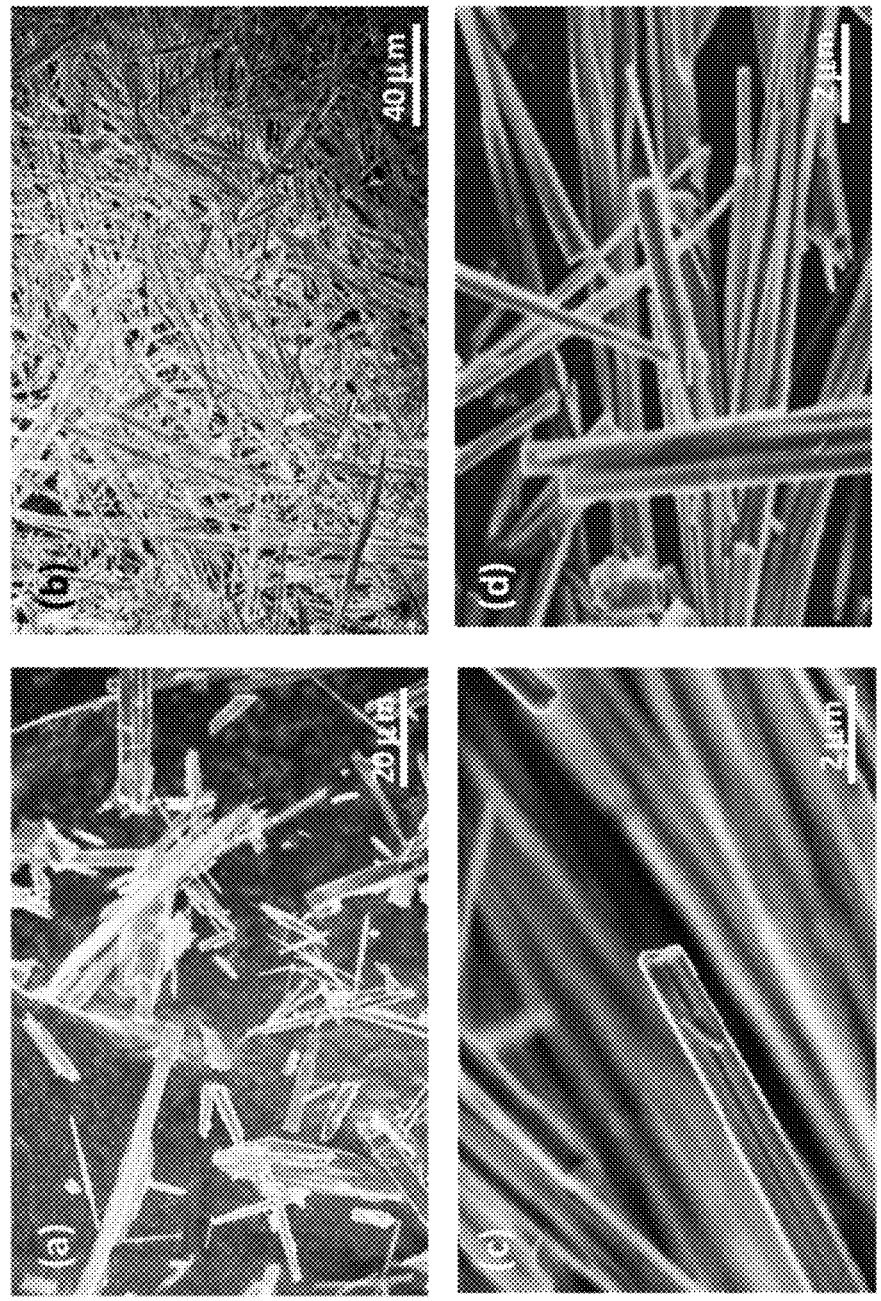
FIGS. 2(a)-(d) are SEM (Scanning Electron Microscopy) images of HA nanoplates and nanofibers made with different gelatin concentrations: (a) no gelatin, (b) and (c) 0.4 g/L, and (d) 2 g/L.
Figure 3:
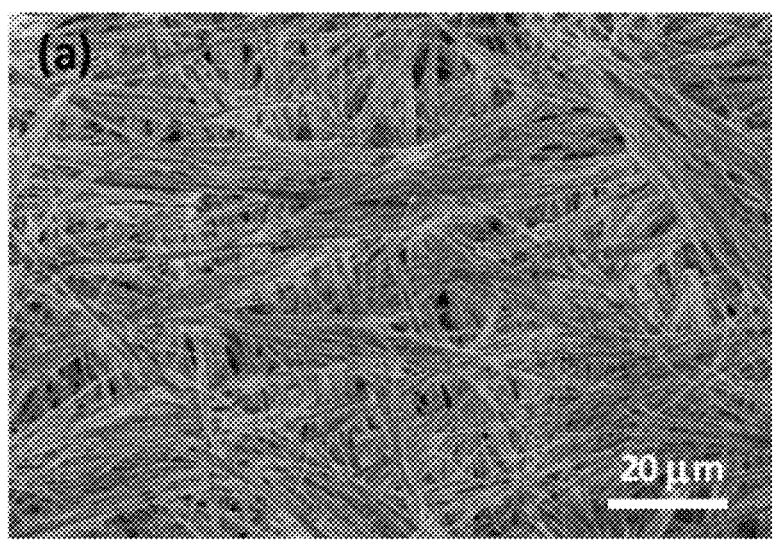
FIGS. 3(a) and (b) are SEM images of HA nanofibers made at 100° C. and with a gelatin (244 bloom) concentration of 1 g/L.
Figure 3:
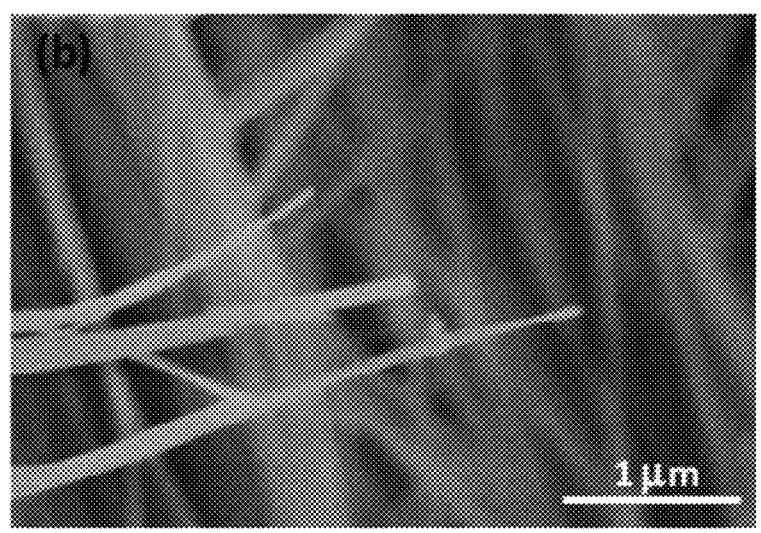

HA reinforcing fillers were fabricated by dissolving $Ca(NO_3)_2$, sodium dihydrogen phosphate $NaH_2PO_4$, gelatin, and urea in water. The concentrations of calcium nitrate $(Ca(NO_3)_2)$, sodium dihydrogen phosphate $(NaH_2PO_4)$, gelatin, and urea are respectively, 0.02 mol/L (mol/liter), 0.02 mol/L, 0.2 g/L (g/liter), and 0.04 mol/L. The mixed solution was then heated from room temperature to 80 to 100° C. and kept at between 80 and 100° C. for 72 hours. The resulting fillers were then filtered, washed with deionized water, and dried at room temperature. The parameters of the synthesis were optimized to provide reinforcing fillers with a high aspect ratio. FIGS. 2(a) to (d) are SEM images of samples made with different gelatin (75 bloom) concentrations. The reaction temperature was 80° C. for all the three experiments; the gelatin concentration was varied between 0 to 2 g/L, and the experiments lasted for approximately 24 hours. Without any gelatin, most HA crystals have a plate-like structure (FIG. 2a). The average length, width, and thickness of HA materials are about 30 μm, 4 μm, and 100 nm, respectively, and such HA materials are HA nanoplates and HA submicroplates. By adding 0.4 g/L of gelatin, the growth in the width direction was significantly impeded and more nanofibers were observed. The average width shrank to 0.50-2 μm and the thickness was about 250 nm. When more (2 g/L) gelatin was added in the solution, more nanofibers were formed. The average diameter was about 200-300 nm. No significant length change was observed for the three conditions with different gelatin concentrations. Gelatin confined the growth of hydroxyapatite fibers, especially in the width direction in solutions. High gel-strength gelatin (225 bloom), had similar effects on the growth of hydroxyapatite as that of low-gel-strength gelatin (75 bloom). FIGS. 3(a) and (b) are SEM images of HA fillers grown at 100° C. for 72 hours. The average length was about 60 μm, twice the length of samples made at 80° C. The average diameter was smaller, about 100 nm. These conditions yield longer and thinner HA fillers. Some HA nanofibers grown at 100° C. are not well dispersed, but primarily bundles.

Figure 4:
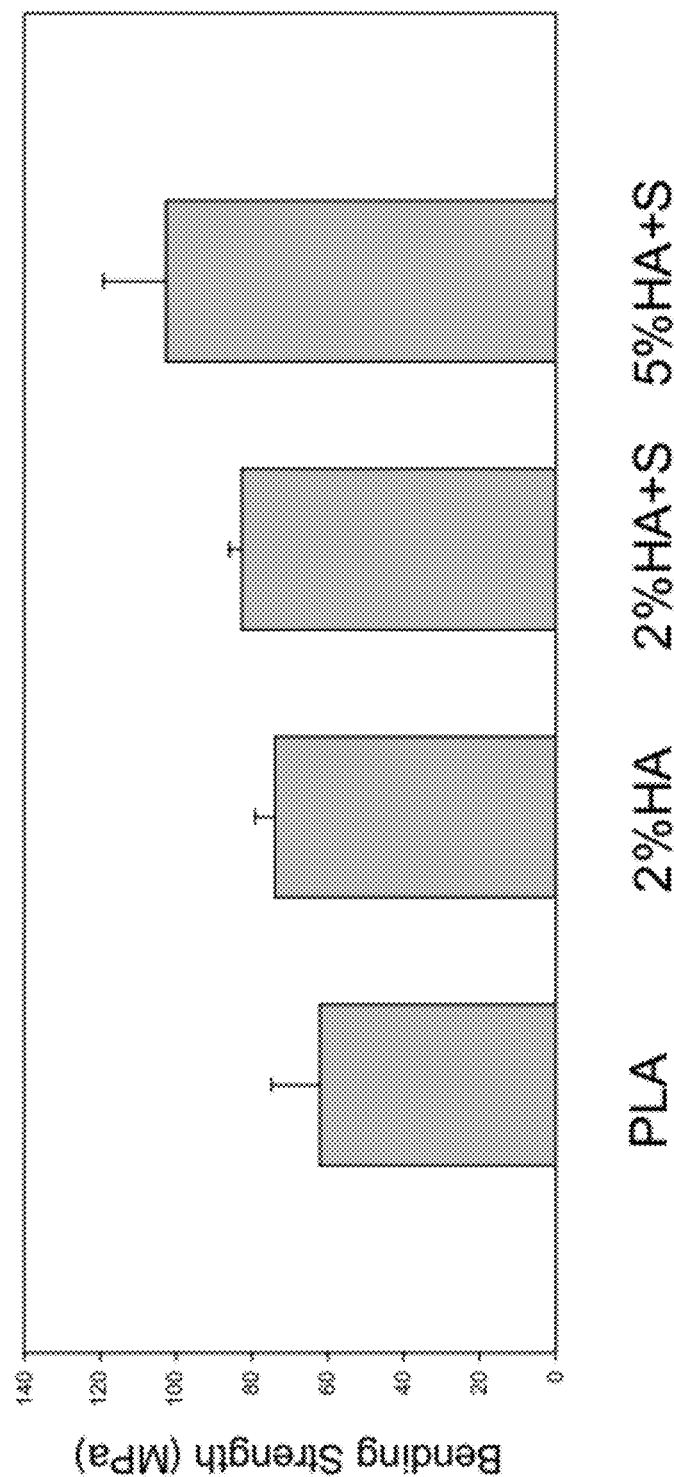
FIG. 4 is a graph comparing the bending strength of poly(L-lactide) (PLA), PLA composites containing 2 wt % HA nanofibers, and PLA composites containing 2 wt % HA nanofibers with sonication.

Example 2. Improvement in Bending Strength of PLA Composites and Modification FIG. 4 shows the effects of modification on a variety of polyp lactide) (PLA) composites. FIG. 4 shows the bending strength (in MPa) of unmodified PLA composites, PLA composites with 2% wt. of as-received HA reinforcing fillers, PLA composites with 2% wt. HA reinforcing fillers with sonication, and PLA composites with 5% wt. HA reinforcing fillers with sonication.

Example 3. Biocompatibility of Fillers and Composites

Cell studies were performed with the MC3T2-EI cell line (American Type Culture Collection, VA). Cells were maintained in a modified alpha minimum essential medium (α-MEM) without ascorbic acid, supplemented with 10% fetal bovine serum (FBS), and incubated in a humidified atmosphere of 37° C. at 5% $CO_2$. MTT (3-(4,5-dimethyl-thiazol-2-yl)-2,5-diphenyltetrazolium bromide) was applied to evaluate cell vitality and proliferation. Mitochondrial dehydrogenases of living cells reduce the tetrazolium ring, yielding a blue formazan product which can be measured spectrophotometrically. The amount of formazin present is proportional to the number of viable cells present.

Figure 5:
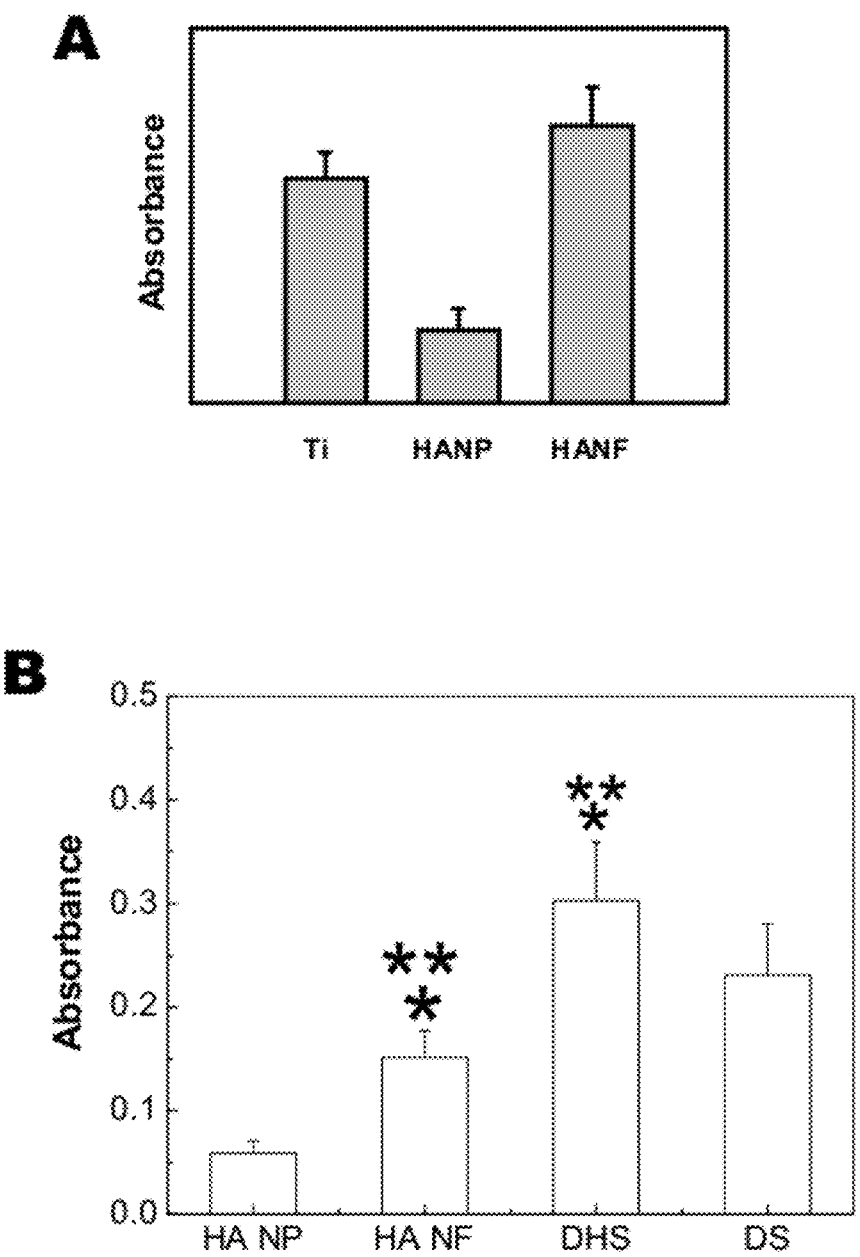
FIG. 5(a) is a graph comparing the biocompatibilities among hydroxyapatite nanoparticles (HANP), hydroxyapatite nanofibers (HANF), and Ti-6Al-4V (Ti, control) on the bottom of wells using MC3T3-E1 cell lines by MTT assay. HA nanofibers have the best biocompatability.
FIG. 5(b) is a graph comparing the biocompatibility among HA nanoparticles (HANP), HA nanofibers (HANF), dental composites containing HA nanofibers and silica microparticles (DHS) and dental composites containing silica microparticles (DS) on the bottom of wells using L929 cell lines by MTT assay.

Using Ti as a control, the biocompatibilities of HA nanofiber fillers and HA nanoparticle fillers were tested. FIG. 5(a) shows the average of several MTT tests. The MTT results indicate that HA nanofibers are significantly more biocompatible in terms of cell vitality and proliferation than HA nanoparticles. Moreover, the MTT results show the advantages over Titanium.

FIG. 5(b) shows the average of several MTT tests using L929 cell lines. The MTT results indicate that HA nanofibers have better biocompatibility that HA nanoparticles and adding HA nanofibers in dental composites also improves the biocompatibility.

Example 4. Glyoxylic Acid Modification

Figure 6:
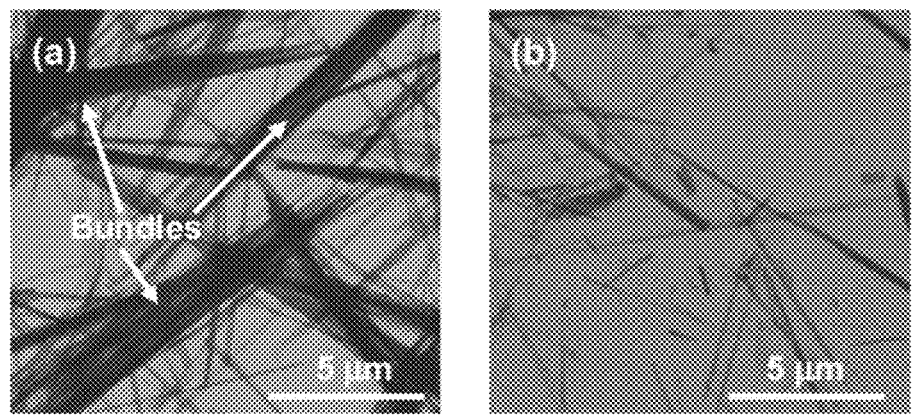
FIGS. 6(a) and (b) are TEM (Transmission Electron Microscopy) images of (a) as-received HA nanofibers and (b) glyoxylic acid-modified HA nanofibers.
Figure 7:
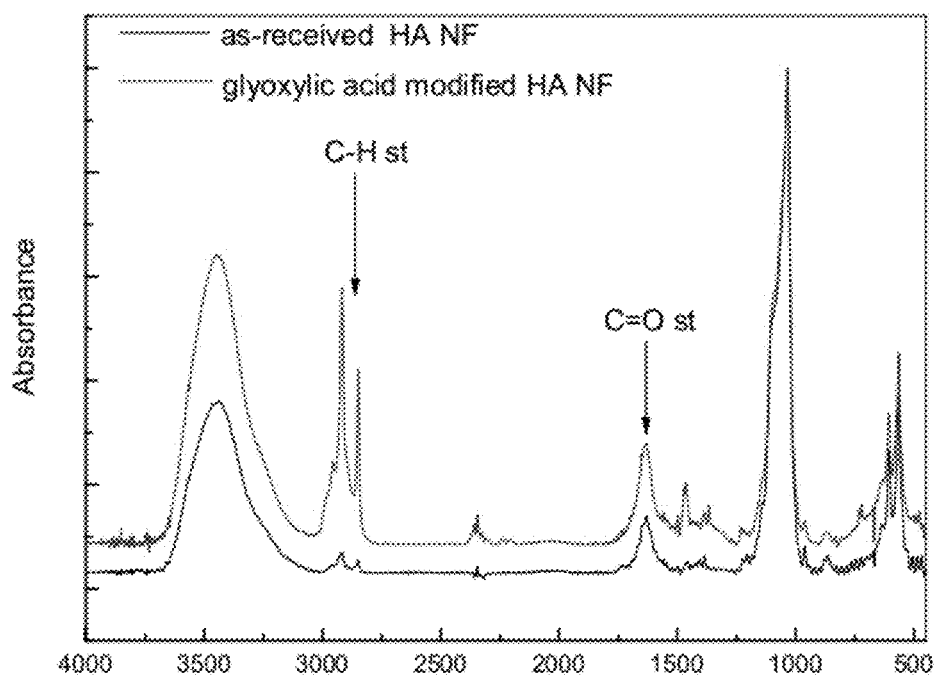
FIG. 7 includes the FT-IR spectra of as-received HA nanofibers (HANF) and glyoxylic acid-modified HA nanofibers.

Glyoxylic acid modification was performed by dissolving 5 g of as-received hydroxyapatite nanofibers in 150 mL of deionized water. 0.39 g of glyoxylic acid was then added and the solution was stirred for 30 minutes. While stirring, 0.28 g of sodium cyanoborohydride was added dropwise. After stirring for 24 hours, the fibers were filtered and rinsed with deionized water 5 times to remove any residual catalyst. Then, HA nanofibers were dried in air at room temperature. FIG. 6(b) shows the TEM (Transmission Electron Microscopy) of the HA nanofibers with significantly improved dispersion. FIG. 7 shows the FT-IR spectra of as-received HA nanofibers and glyoxylic acid-modified HA nanofibers. FT-IR shows that, compared to the as-received HA nanofibers, the intensities of the peaks for C=O (approx. 1640 $cm^{-1}$), C—H (approx. 2918, 2850, 1470 $cm^{-1}$), and OH (approx. 3457 $cm^{-1}$) bands are significantly higher. These results indicate that the there are more C=O, C—H, and OH moieties in the modified sample.

Example 5. Biaxial Flexural Strength

Various HA nanofibers and 0.7 micrometer size silanized silica particles were tested in a polymer matrix. The polymer matrix contained 49.5 wt % Bis-GMA and 49.5 wt % co-monomer TEGDMA, camphorquinone (0.5 wt %) and ethyl-4-dimethylaminobenzoate (0.5 wt %). HA nanofibers were added in mass fractions of 2 wt %, 3 wt %, 5 wt %, 7 wt. % and 10 wt % 60 wt. % of with size silanized silica particles was also tested as a control. The desired reinforcing fillers were added to vials with Bis-GMA and TEGDMA and acetone. An ultrasonic horn was used to disperse the fillers in the polymer matrix. Camphorquinone and ethyl-4-dimethylaminobenzoate were added as initiators and the vial was covered with foil. After mixing thoroughly, the solutions were added to a Teflon® mold (diameter 12 mm, thickness 1.5 mm) covered by a glass slide. The samples were cured.

Figure 8:
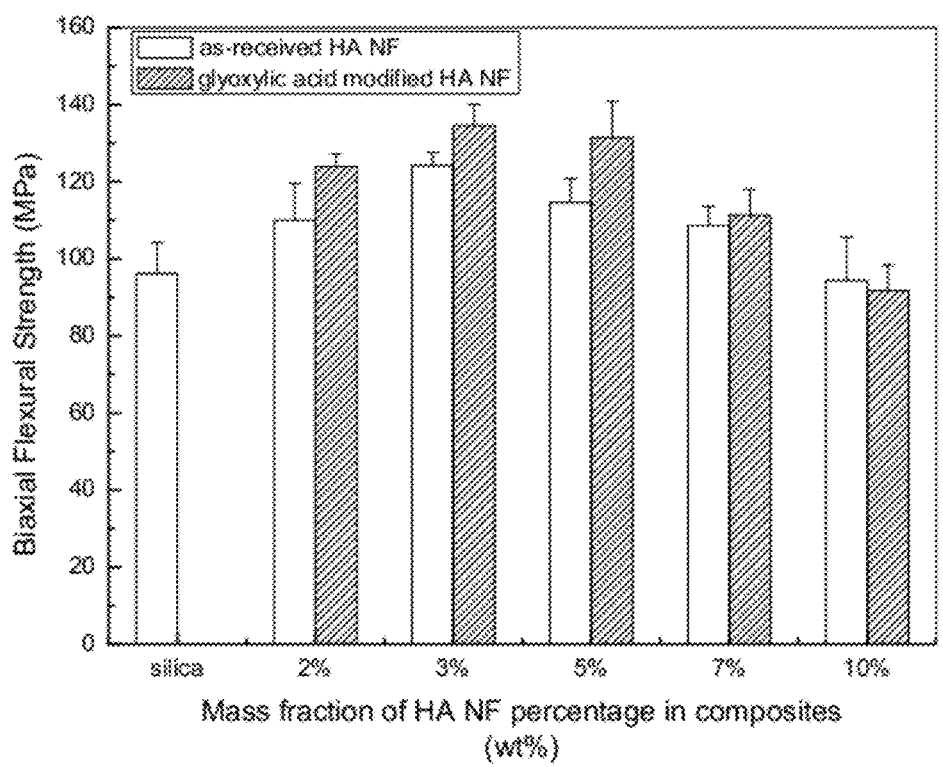
FIG. 8 is a graph comparing the biaxial flexural strengths among Bis-GMA/TEGDMA (1:1 weight ratio) dental composites filled with various mass fractions of as-received and glyoxylic acid-modified HA nanofibers and 0.7 micrometer size silica. The total inorganic filler mass fraction is 60%.

A SMS TA HDPlus Texture Analyzer was centered on the disk specimen. A 100 kg load cell was used to apply the load, and the samples were supported by three ball bearings positioned 120° apart from one another on a circle. The SMS TA HDPlus recorded the load applied as a function of time. Biaxial flexural strength was calculated according to a commonly used method reported by Skrtic and Antonucci (2004). FIG. 8 shows an average of several experiments. FIG. 8 shows the improvement of glyoxylic acid-modified HA nanofibers over as-received HA nanofibers. The biaxial flexural strength for the polymer composites was highest at 3 wt % HANF and 5% HANF. The 3 wt % as-received HA nanofibers had a biaxial flexural strength of 124.2±3.5 MPa, 29% higher than the control, and the 3 wt % glyoxylic acid-modified HA fibers had a biaxial flexural strength of 134.5±3.4 MPa, 40% higher than the control.

Example 6. Silanization and Composite Strength

Figure 9:
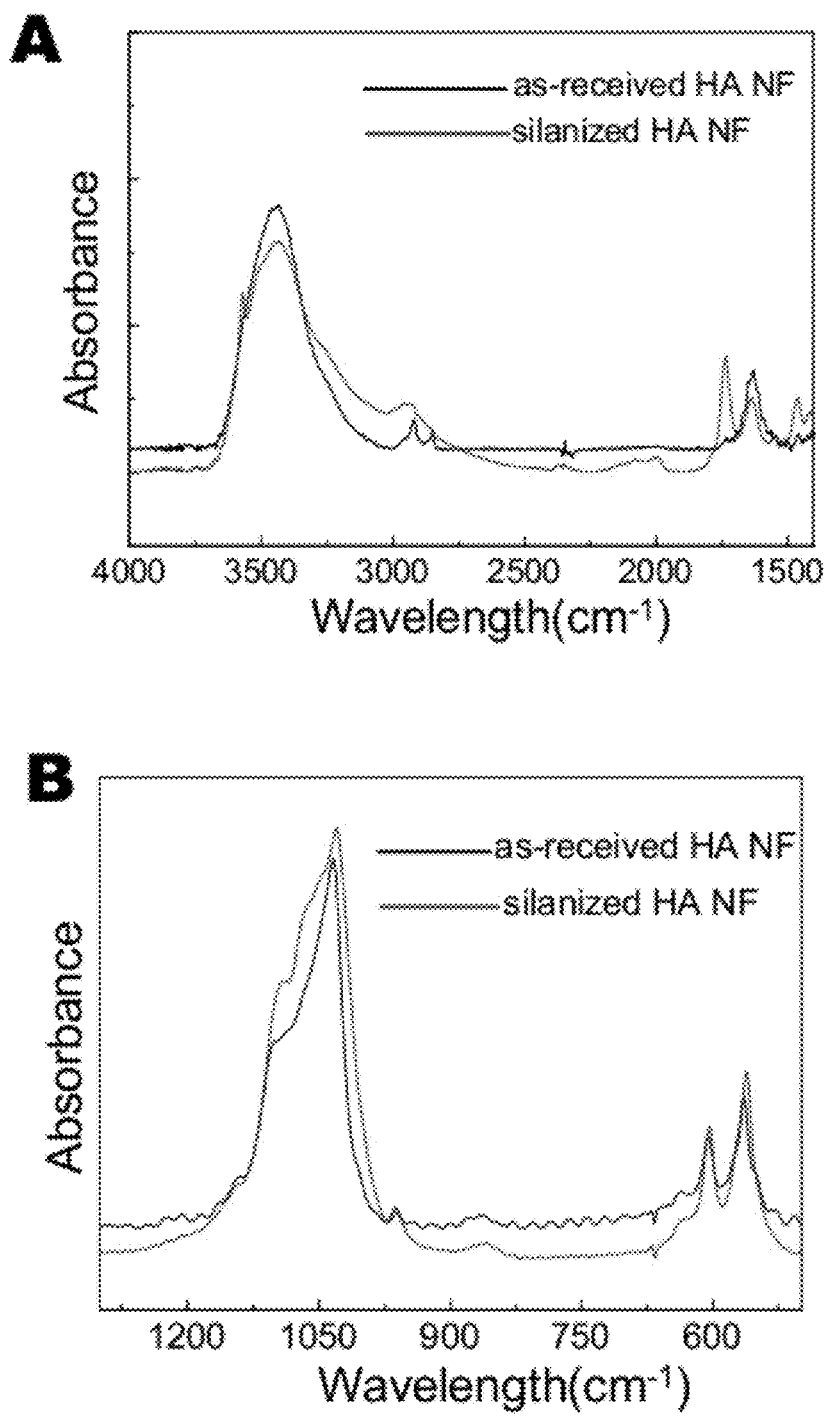
FIGS. 9(a) and (b) are FT-IR spectra of as-received HA nanofibers (HANF) and silanized HA nanofibers.

The silanization process was conducted on 5 g hydroxyapatite reinforcing filler. 15 mL of 3-methacryloxypropyltrimethoxy silane were added to a 300 mL mixture of acetone and water (70/30). The solution was heated to 40° C. for 3 hours under constant magnetic stirring, followed by further treatment at 60° C. for 5 hours. Next, the mixture was filtered and washed with acetone and water at least twice and then transferred to an oven at 120° C. for 2 hours to remove excess water and solvent. FIGS. 9(*a*) and (*b*) are the high resolution FT-IR spectra of HA reinforcing fillers before and after silanization treatment. Besides the characteristic peaks of HA and gelatin, the characteristic absorbance bands of silane (3-methacryloxypropyltrimethoxy silane), including the stretching vibration of methacrylate C=O (approx. 1720 $cm^{-1}$) and symmetric stretching of Si—O—Si—H (approx. 2004 $cm^{-1}$) were identified on the FT-IR spectra. The fabrication of a sample and the mechanical testing were similar to Example 5. Water absorption of dental composites containing silanized HA reinforcing fillers was investigated based on the American Dental Association protocol (ADA, 1993).

Figure 10:
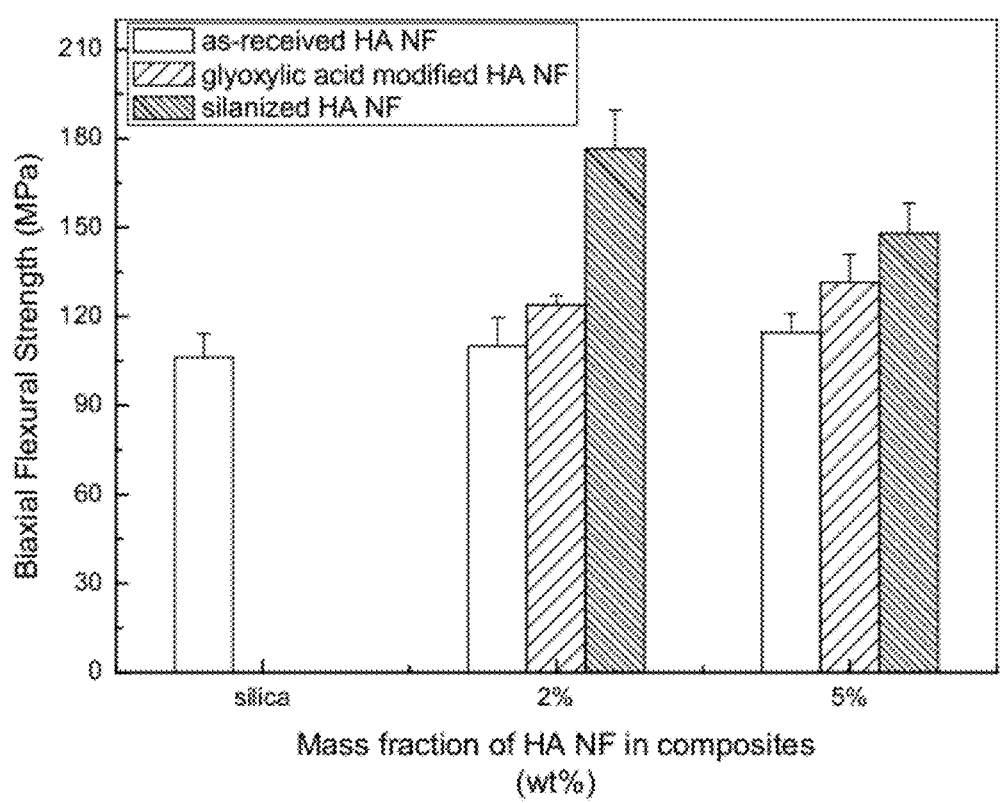
FIG. 10 is a graph comparing the biaxial flexural strengths among Bis-GMA/TEGDMA (1:1 weight ratio) dental composite filled with various mass fraction of as-received glyoxylic acid-modified and silanized HA nanofibers and 0.7 micrometer size silica. The total inorganic filler mass is 60%.

The biaxial flexural strength testing results are included in FIG. 10. As shown in FIG. 10, the addition of as-received HA reinforcing fillers without fillers did not significantly improve the biaxial flexural strength over the control. Addition of glyoxylic acid-modified HA and silanized HA improved the mechanical strength significantly.

Figure 11:
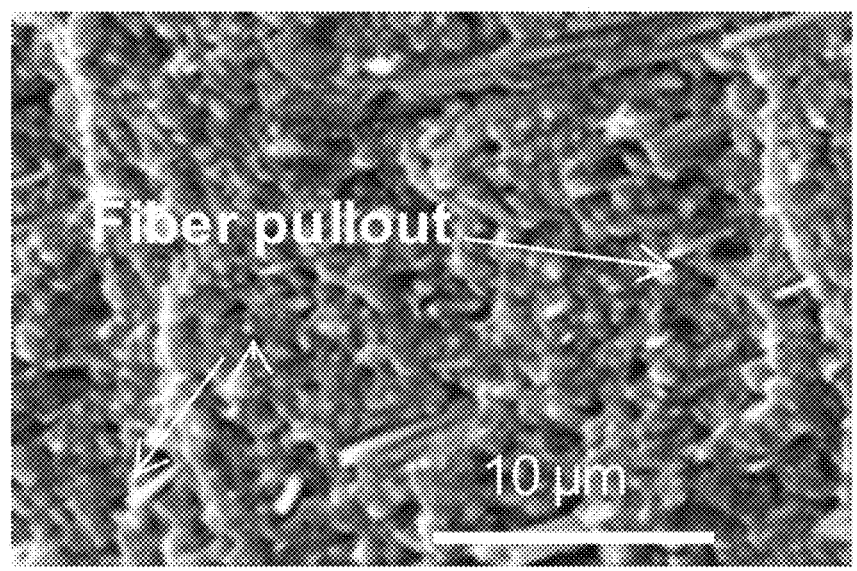
FIG. 11 is a SEM image of fracture surface of dental composites containing 5% silanized HA nanofibers and 55% silica particles.

FIG. 11 is the SEM (Scanning Electron Microscopy) image of the surface of dental composites reinforced by 5 wt % silanized HA reinforcing fillers in 55 wt % silica microparticles. As shown in FIG. 11, individual bundle size was typically smaller than 1 micrometer, much smaller than the bundles in as-received HA reinforcing fillers. FIG. 11 also shows fiber pullout in the composite.

Figure 12:
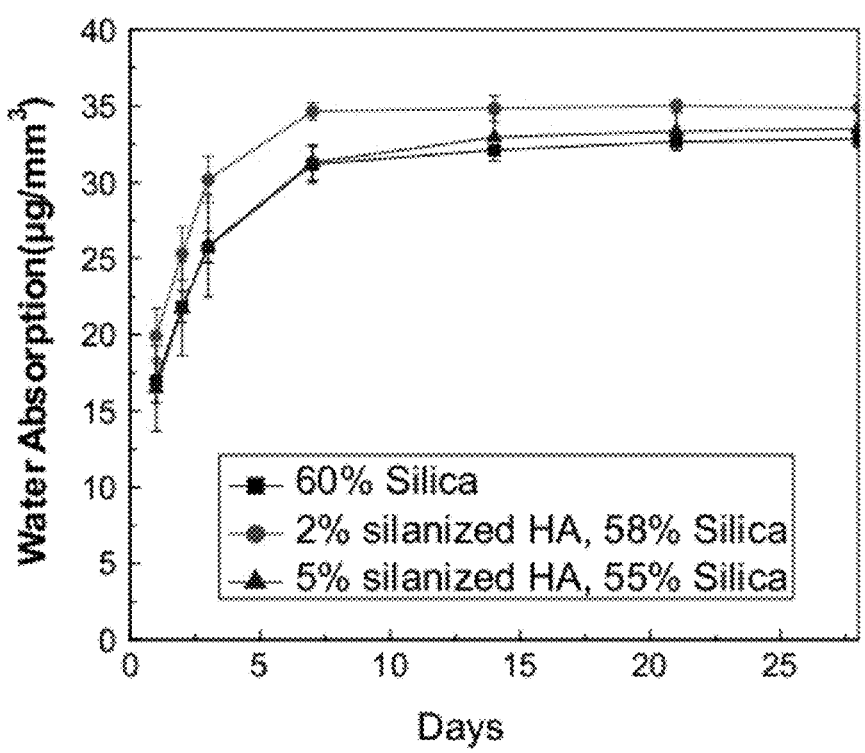
FIG. 12 compares the water absorption rate ($\mu L/mm^3$) among the dental composites containing 60 wt % silica and 2 wt % silanized HA reinforcing fillers, and 58 wt % silica and 5 wt % silanized HA reinforcing fillers after immersion in distilled water.

The composites were also immersed in distilled water for 7 days. FIG. 12 compares the water absorption rate of the composites. As shown in FIG. 12, both 2% silanized HA reinforced composites and 5% silinized HA reinforced composites have smaller water absorption rate (35 $\mu g/mm^{-3}$ and 36 $\mu g/mm^{-3}$, respectively) than that of the ADA standard (40 $\mu g/mm^{-3}$).

Example 7. Acrylic Acid Treatment and Composite Strength

Modification of a hydroxyapatite reinforcing fiber was also carried out using acrylic acid. 1.00 g of as-received HA reinforcing fillers were added to acetone and sonicated by a Sonifier® 450 (Branson, Inc.) for 20 minutes. 3.00 g acrylic acid was added into the mixture and homogenized by the Sonifier® for 15 minutes. The suspension was magnetically stirred at 50° C. for 12 hours. Next, the suspension was washed to remove unbound acrylic acid. Acrylic acid-modified HA nanofibers were dried and stored in ambient conditions for later use.

Acrylic acid-modified HA reinforcing fillers were added to a polymer matrix of Bis-GMA:TEGMA 2:1. A mixture of the polymers, the acrylic acid-modified HA nanofibers, and the silica particles were magnetically stirred with 5 mL of acetone for 30 minutes. The mixture was then subjected to sonification in the Sonifer® 450 for 10 minutes. The mixture was magnetically stirred for another 2 hours at 50° C. Camphorquinone and ethyl 4-dimethylamino-benzoate were added into the solution while the reactor was covered completely with foil to prevent curing. The mixture was refrigerated at 4° C. for 1 hour.

Figure 13:
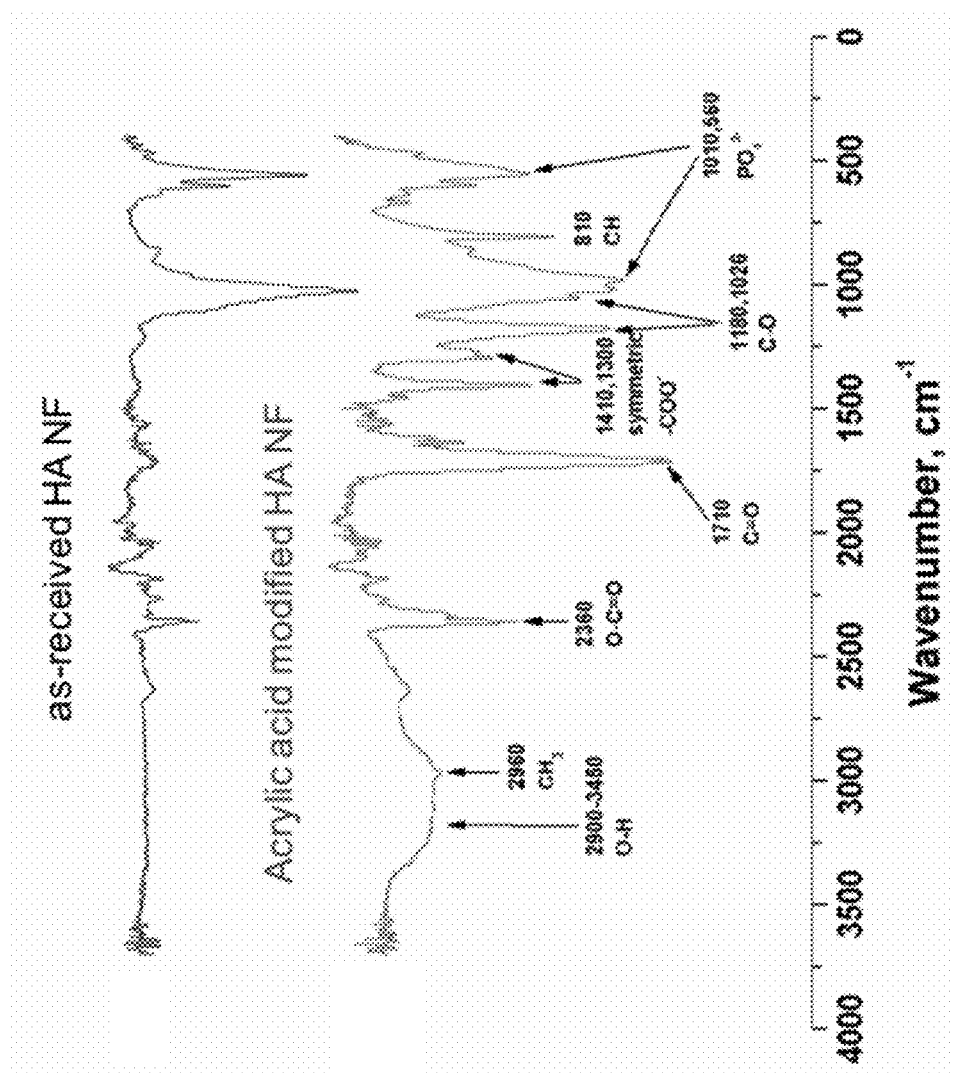
FIG. 13 includes the FT-IR spectra of as-received HA reinforcing fillers and acrylic acid-modified HA reinforcing fillers.

The mixture was placed in a round mold covered by glass slides. The mechanical properties were tested using the protocol in Example 5. The dried as-received fibers and the acrylic acid-modified HA reinforcing fillers were characterized by FT-IR. FT-IR confirmed the surface modification. As shown in FIG. 13, carbonyl moiety (C=O, 1710 $cm^{-1}$) and hydroxyl moiety (OH, 2900-3450 $cm^{-1}$) were observed for acrylic acid-modified HA reinforcing fillers.

Figure 14:
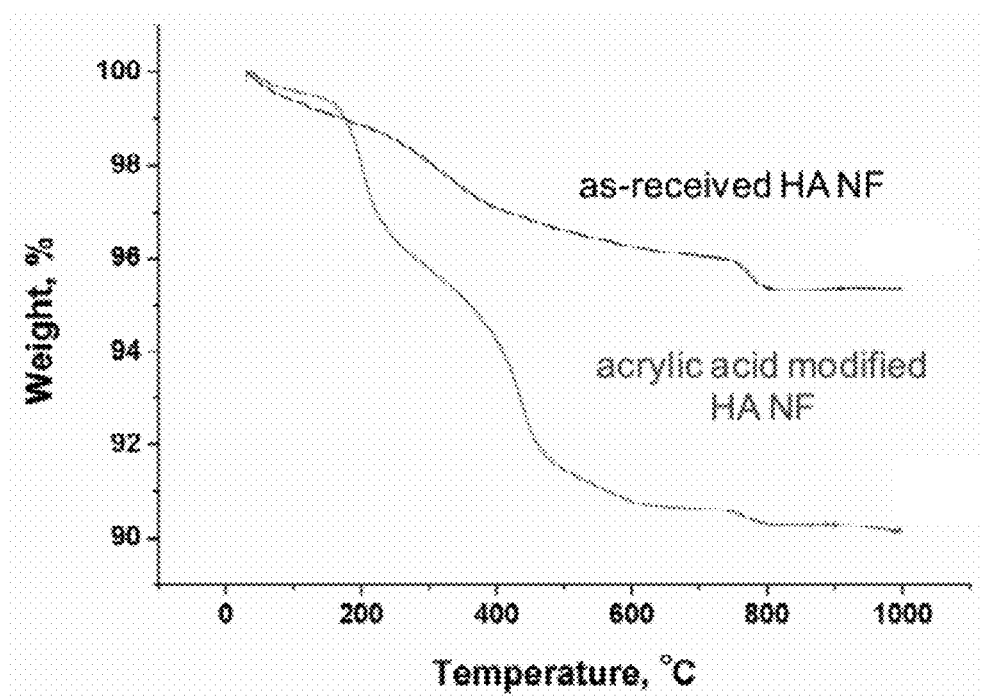
FIG. 14 is a graph showing thermal gravimetric analysis of as-received HA reinforcing fillers and acrylic acid-modified HA reinforcing fillers.

Thermogravimetric Analysis (TGA) was carried out for the as-received HA reinforcing fillers and acrylic acid-modified HA fillers with a Q-5000-IR (TA Instruments, Inc.) and the weight loss was measured by Universal Analysis 2000. Nitrogen (10.0 mL/min) was used as a balance gas. The measurements were performed from 30° C.-1000° C. As shown in FIG. 14, two different weight loss steps were found in acrylic acid-modified HA reinforcing fillers in the range of 162-235° C. and 374-452° C., compared to as-received HA fillers.

Figure 15:
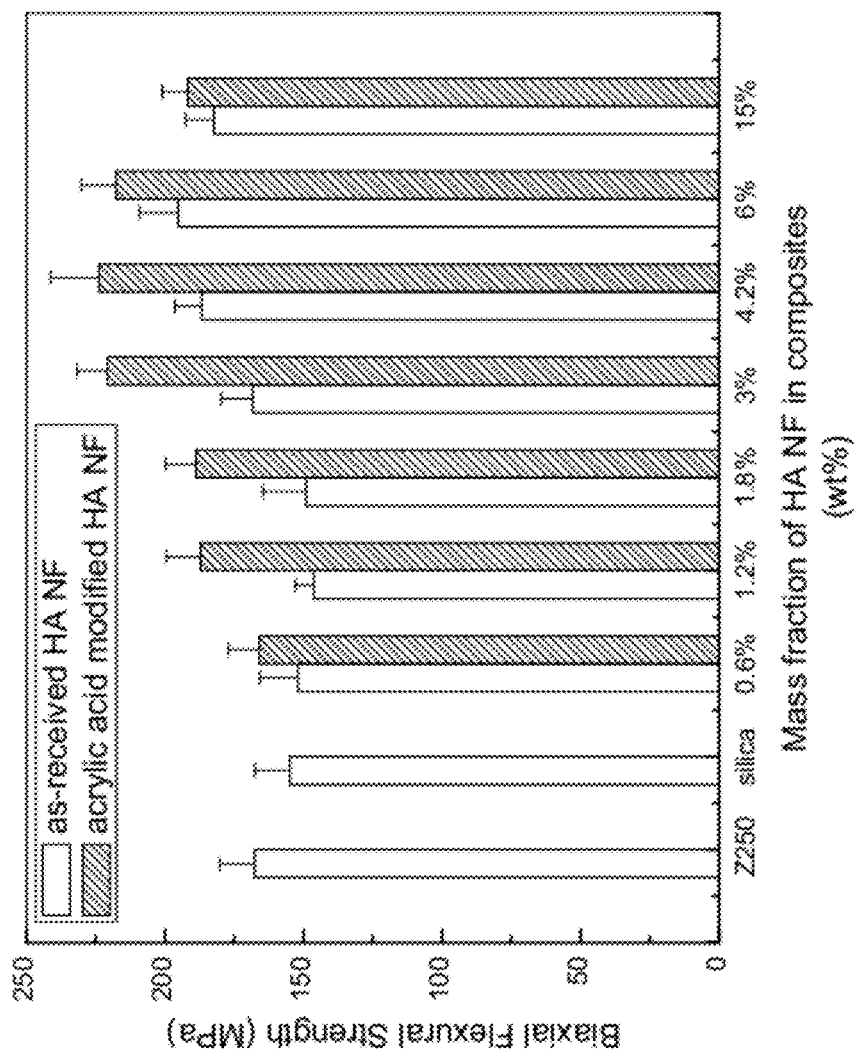
FIG. 15 is a graph comparing the biaxial flexural strengths among the Bis-GMA/TEGDMA (2:1 weight ratio) dental composites filled with various mass fractions of as-received and acrylic acid-modified HA reinforcing fillers and 0.7 micrometer size silica. The total inorganic filler mass fraction is 60%. Filtek Z250 (Z250) from 3M ESPE Company is used as the control.

Biaxial flexural strengths were also measured against a 3M Filtek Z25® as a control (consists only of silica particle fillers). FIG. 15 shows, in comparison to 3M Filtek Z250 product, both acrylic acid-modified HA reinforcing fillers have a higher/better reinforcing effect for than silica only.

Example 8. Surface Modification of HA Reinforcing Fillers with Different Modifications The HA reinforcing filler was surface modified with three reagents, 12-aminododecanoic acid, dodecanoic acid and dodecanedioic acid, respectively. Surface functional group titration was used to characterize the surface modification. The result is shown in FIG. 16. All the modifications were carried out at 95° C. to determine the extent of functionalization. The surface carboxyl group titration result shows twice as many carboxylic acid moieties on the surface of dodecanedioic acid modified reinforcing filler, and twice as many amino moieties on the surface of 12-aminododecanoic acid modified HA reinforcing fillers.

Figure 17:
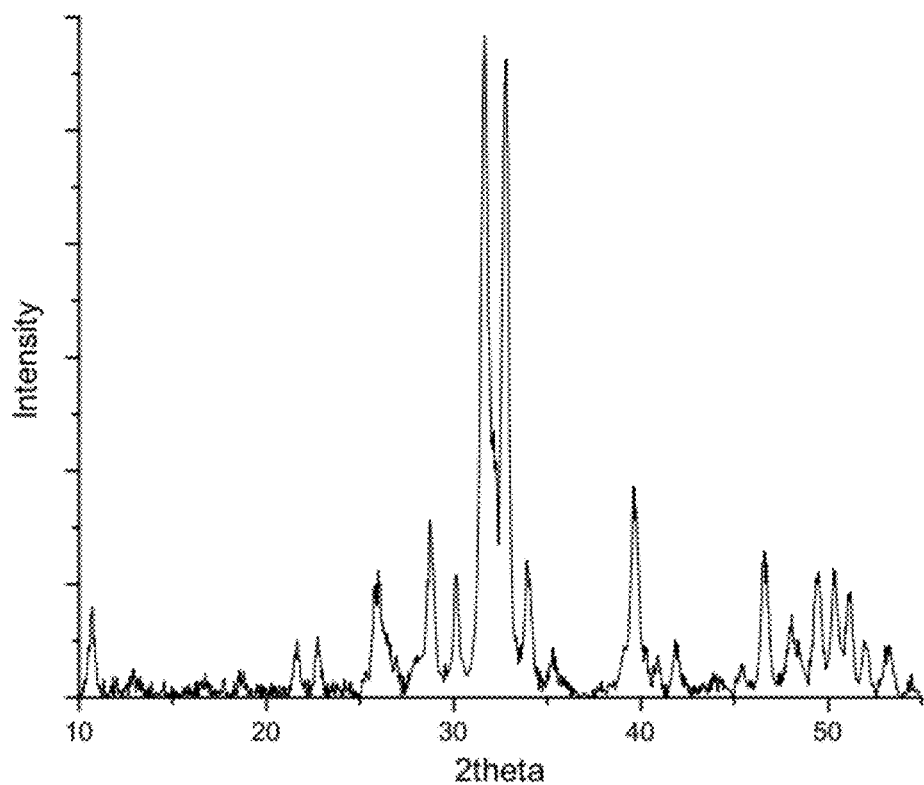
FIG. 17 is a graph showing the X-ray diffraction spectrum of DCPA nanofibers after 9 hours.
Figure 18:
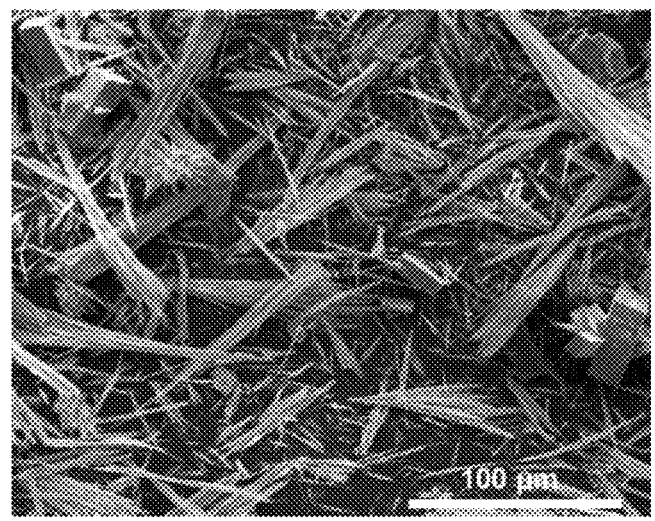
FIG. 18 is the SEM image of the DCPA and HA reinforcing reinforcing fillers.

Example 9. DCPA Reinforcing Filler Synthesis and Dental Composites with DCPA Reinforcing Fillers DCPA reinforcing fillers were fabricated by dissolving $Ca(NO_3)_2$, sodium dihydrogen phosphate $NaH_2PO_4$, gelatin, and urea in concentrations of 0.02 mol/L (mole/liter), 0.02 mol/L, 0.2 g/L (gram/liter), and 0.04 mol/L, respectively. The mixed solution was then heated from room temperature to 95° C. and kept at 95° C. for 1 to 9 hours. The resulting reinforcing fillers were then filtered, washed with deionized water, and dried at room temperature to give dried reinforcing fillers. X-ray diffraction (XRD) in FIG. 17 showed the characteristic peaks of DCPA at 28 regions of 26.5°, 30.1° and 30.3°, respectively. FIG. 18 shows the SEM images of the DCPA nanofibers.

Figure 19:
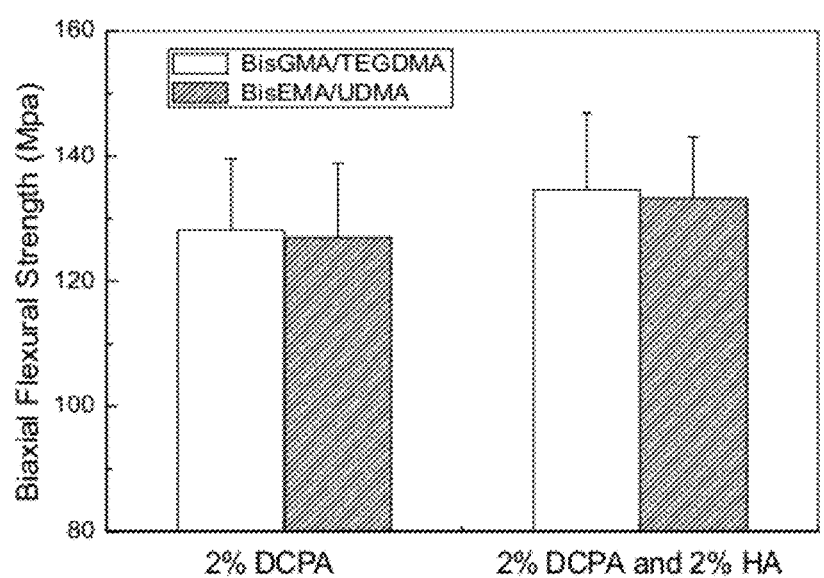
FIG. 19 is a graph showing the biaxial flexural strength of BisGMA/TEGDMA or BisEMA/UDMA based dental composites containing 2 wt % DCPA reinforcing fillers and dental composites containing 2 wt % DCPA reinforcing fillers plus 2 wt % HA reinforcing fillers.

2,2-bis[4-(2-hydroxy-3-methacryloyloxypropyl)phenyl] propane/T triethylene glycol dimethacrylate and ethoxylated bisphenol-A-dimethacrylate/1,6-bis-[2-methacryloyloxy-ethoxycarbonylamino]-2,4,4-trimethylhexane based dental composites containing DCPA reinforcing fillers and the combination of DCPA and HA reinforcing fillers were fabricated and the biaxial flexural strengths were measured. FIG. 19 shows that dental composites containing 2 wt % DCPA have significantly higher biaxial flexural strength than control (~100 MPa, dental composites containing silica particles only).

Example 12. Preparation of Injection Molded PLA Composites with HA Reinforcing Fillers Injection molding has been used to make HA reinforced fillers in PLA matrices. PLA resin (Purac) was stored at 15° C. to prevent degradation. In order to achieve good dispersion and mixing effect, the PLA pellets were milled to small particles in a blender (Blentec) for 3 minutes 20 seconds at the highest speed. Then, the milled PLA particles and reinforcing fillers were mixed in a mortar and the mixtures were grounded for 90 seconds and stored in plastic bags on 15° C. until the machine was ready for injection molding. A mini-jector model 45 was used to injection mold the pure PLA and PLA/HA samples. 25 grams of PLA/HA was heated to 232° C. inside the injection cylinder for 5 minutes. After this, the samples were injection molded into ASTM standard aluminum mold (ASTM D638 standard test specimen IV and ASTM D5934) on 95 psi pressure, 6 second injection time and 232° C. of nozzle temperature. After the injection molding process, the samples were removed from the mold and stored in a dessicator for the mechanical tests. Both the tensile test (ASTM D638) and bending test (ASTM D5934) were performed with an Instron model 3600 on corresponding ASTM standard.

Figure 20:
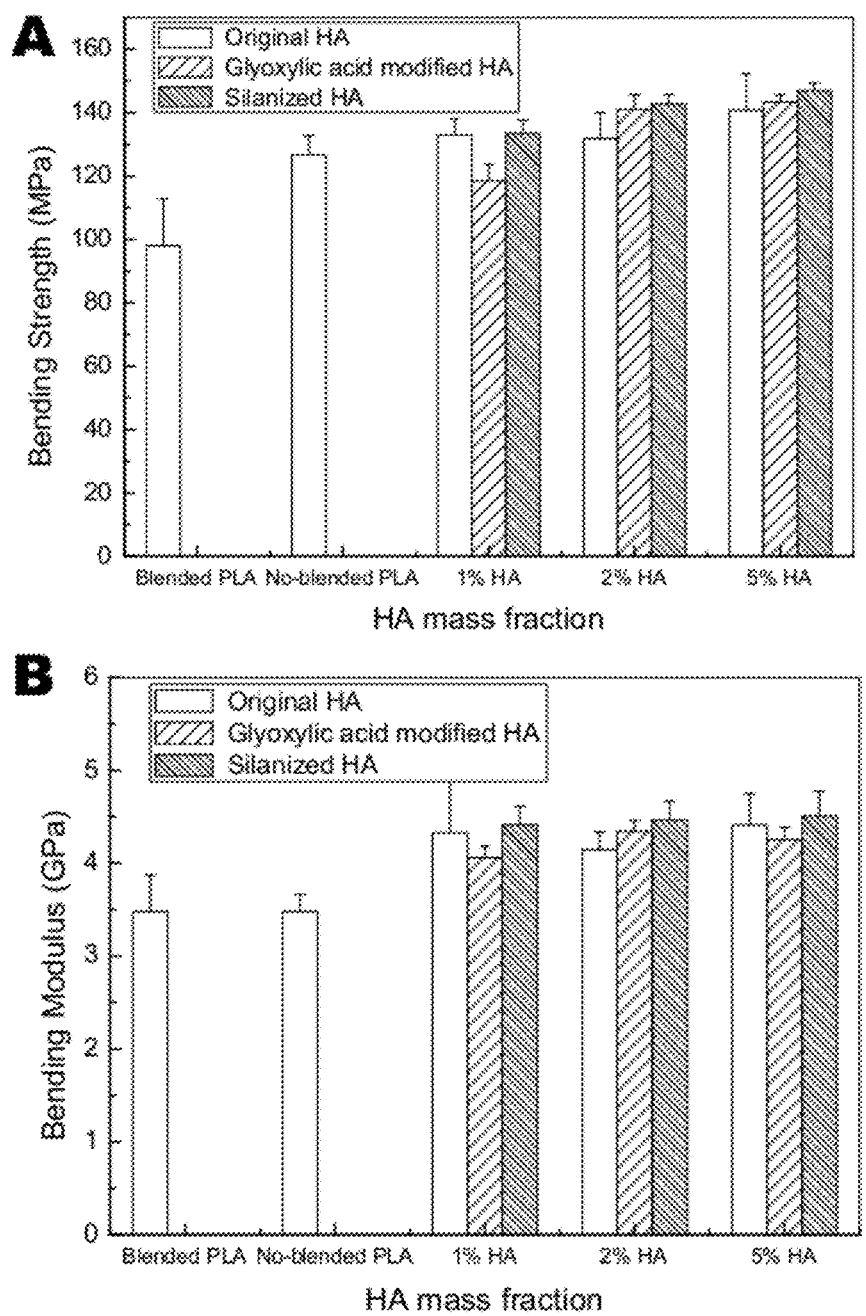
FIG. 20 shows the bending strength (a) and modulus (b) of injection molded PLA based composites filled with original, glyoxylic acid modified, and 3-MPS silanized HA reinforcing fillers at different mass fractions. Pure PLA (blended and non-blended) are used as controls.
Figure 21:
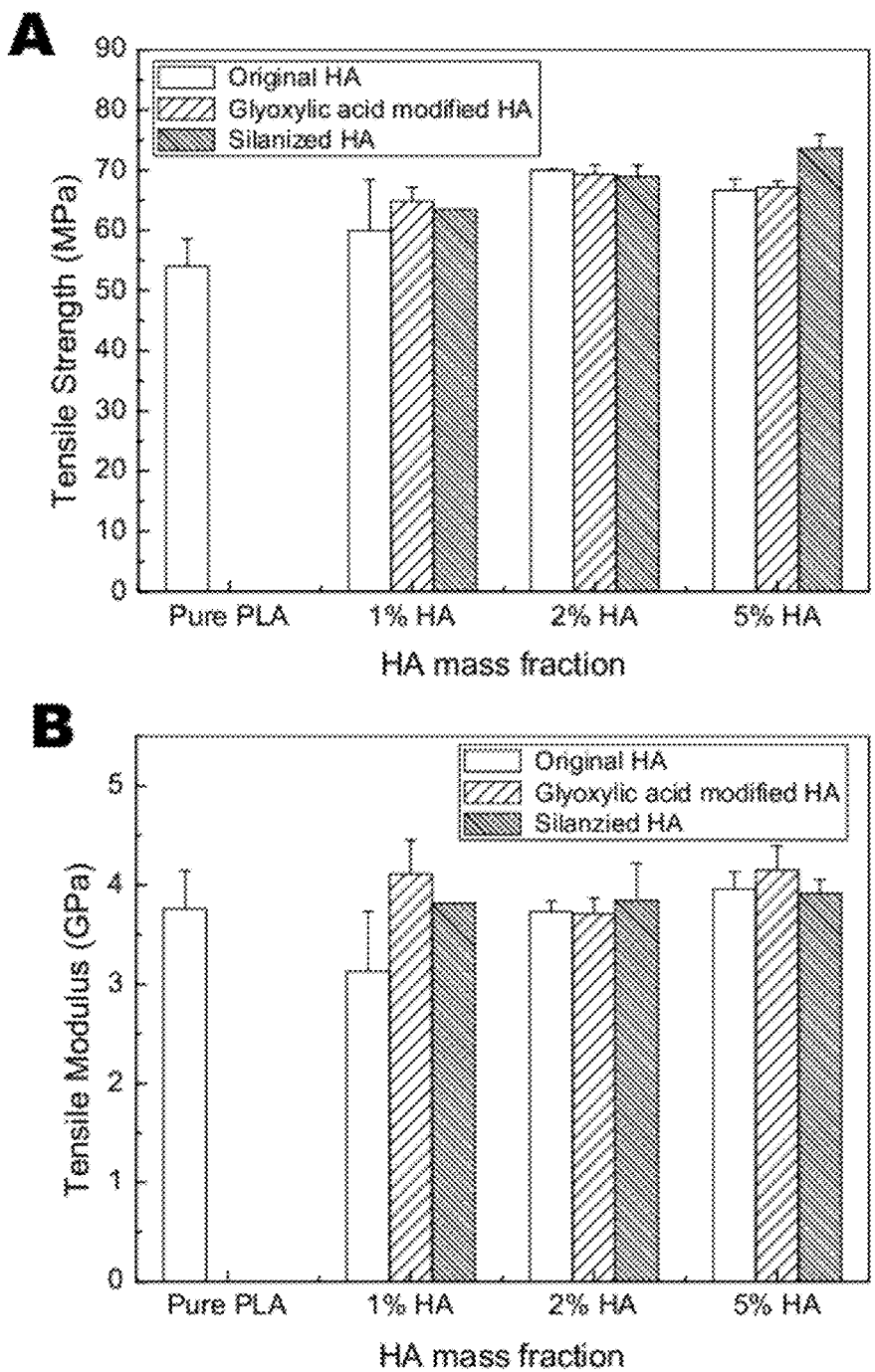
FIG. 21 shows the tensile strength (a) and modulus (b) of injection molded PLA based composites filled with original, glyoxylic acid modified, and 3-MPS silanized HA reinforcing fillers at different mass fractions. Pure PLA (blended) are used as controls.

As shown in FIG. 20(a), the addition of reinforcing fillers can significantly improve the bending strength of the polymer matrix. The incorporation of 5 wt % silanized reinforcing fillers increased the bending strength by 49.8% compared with pure blended PLA. In addition, the surface modifications enhanced the bending strength. FIG. 20(b) shows that the bending modulus up to 29.6% in comparison with pure blended PLA. The tensile strength and modulus are presented in FIG. 21. Tensile strength was significantly increased from 54.1±4.5 MPa to 73.6±2.3 MPa with the addition of 5 wt % silanized HA reinforcing fillers, which is 36.1%. The tensile modulus was also substantially improved.

Figure 22:
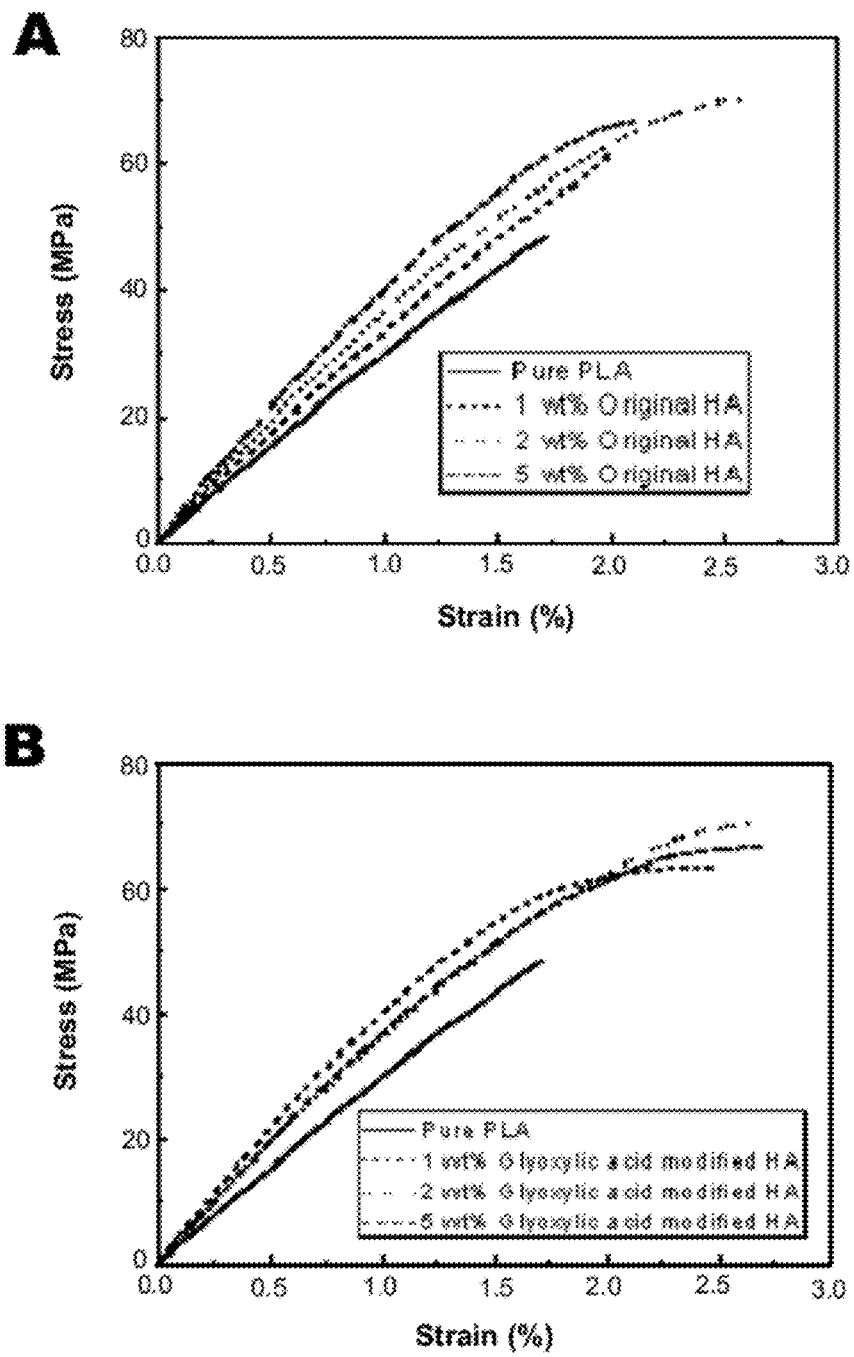
FIG. 22 shows the typical tensile stress-strain curve of (a) injection molded pure PLA and PLA composites containing different amount of original HA reinforcing fillers, (b) injection molded pure PLA and PLA composites containing different amount of glyoxylic acid modified HA reinforcing fillers, and (c) injection molded pure PLA and PLA composites containing different amount of 3-MPS silanized HA reinforcing fillers.
Figure 22C:
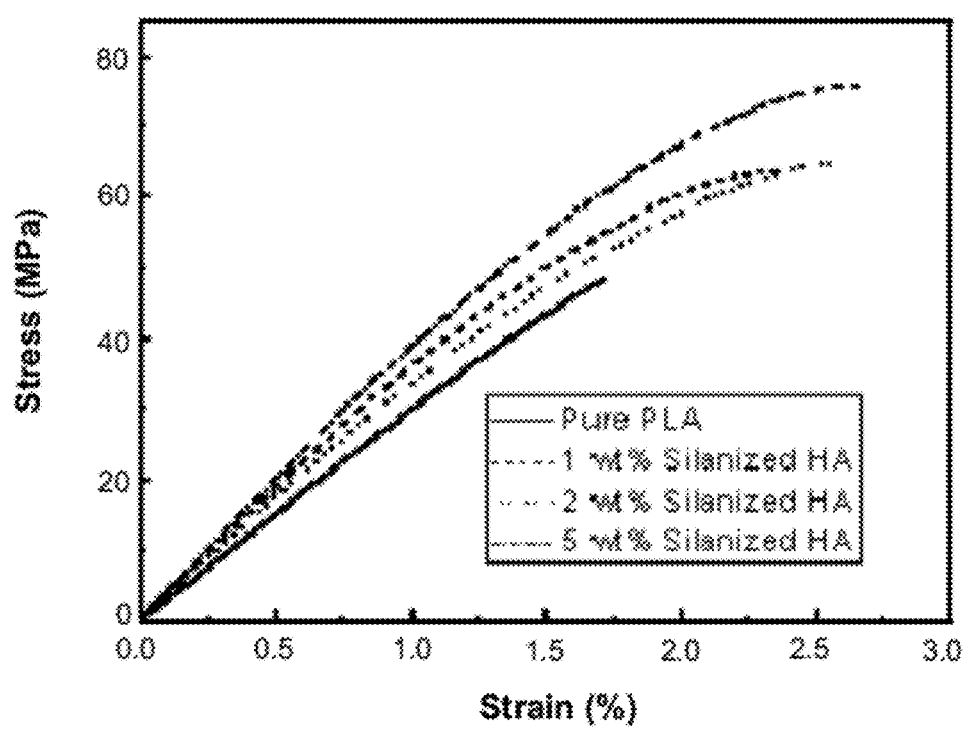
Figure 23:
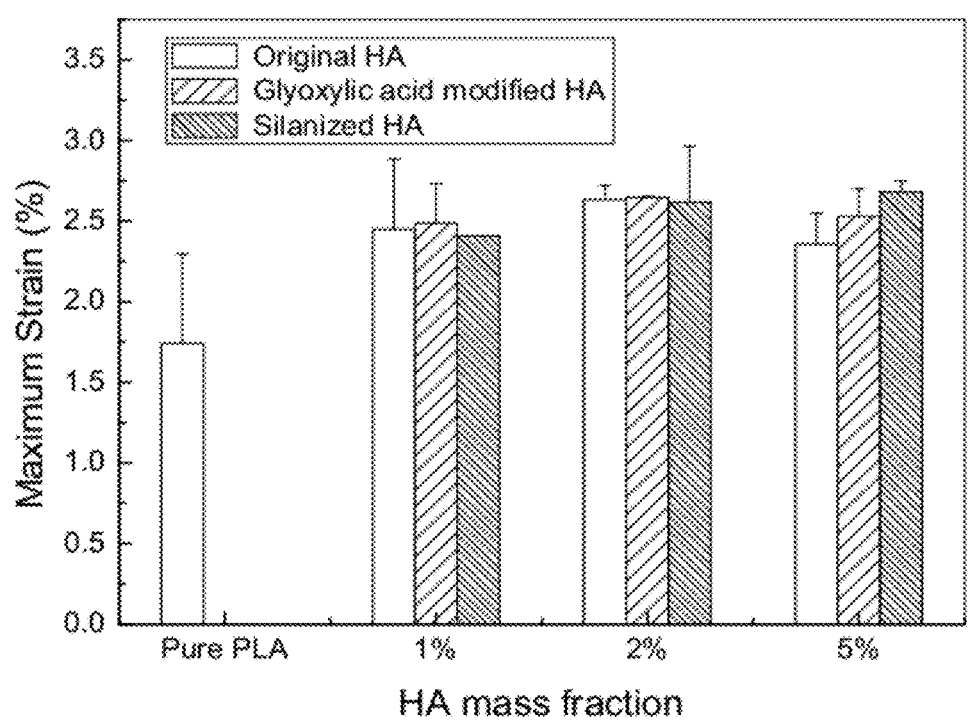
FIG. 23 is a graph showing the average maximum tensile strain, elongation, of injection molded pure PLA and PLA composites containing different amount of original, glyxoylic acid modified and 3-MPS modified HA reinforcing fillers. Higher maximum strain (elongation) also indicates higher toughness and higher resistance to impact and catastrophic failure.

FIG. 22 shows typical stress-strain curve of PLA and PLA composites containing original unmodified HA reinforcing fillers, glyoxylic acid modified HA reinforcing fillers and silanized HA reinforcing fillers. FIG. 23 shows the maximum strain of different samples. In all cases, the maximum strain at the failure point increase with addition of as-received or surface modified HA nanofibers from ~1.7% to 2.3%-2.6%. The maximum strain was also referred to as elongation, which characterizes how much materials could be elongated in a tensile test at failure. Higher elongation indicates higher toughness and higher resistance to impact.

It is understood that the foregoing detailed description and accompanying examples are merely illustrative and are not to be taken as limitations upon the scope of the invention, which is defined solely by the appended claims and their equivalents. Various changes and modifications to the disclosed embodiments will be apparent to those skilled in the art. Such changes and modifications, including without limitation those relating to the chemical structures, formulations, or methods of use of the invention, may be made without departing from the spirit and scope thereof.

What is claimed is:

1. A polymer composite, comprising: a polymer matrix and a reinforcing filler wherein the reinforcing filler comprises calcium phosphate nanofibers, submicron fibers, or combinations thereof, wherein the reinforcing filler has a gelatin coated surface comprising amine moieties, carboxylic acid moieties, or combinations thereof, and wherein the reinforcing filler has a diameter or thickness ranging between about 10 nm and about 1 μm and an aspect ratio ranging between about 50 and about 5,000 and is present in an amount ranging from about 0.6 wt. % to about 15 wt. %.

2. The polymer composite of claim 1, wherein the amine moieties, carboxylic acid moieties, or combinations thereof on the gelatin coated surface are modified with a reagent selected from the group consisting of alkyls, amines, carboxylic acids, peroxides, and silanes.

3. The polymer composite of claim 1, wherein the reinforcing filler is present in an amount ranging from about 0.6 wt. % to about 6 wt. %.

4. The polymer composite of claim 1, wherein the reinforcing filler is bundled.

5. The polymer composite of claim 1, wherein the diameter or thickness of the reinforcing filler is between about 50 nm and about 500 nm.

6. The polymer composite of claim 1, wherein the aspect ratio is between about 100 and about 500.

7. The polymer composite of claim 1, wherein the polymer matrix comprises a mixture of bisphenol A glycidyl methacrylate and triethylene glycol dimethacrylate.

8. The polymer composite of claim 1, wherein the polymer matrix comprises poly(L-lactide).

9. The polymer composite of claim 4, wherein the bundles have a diameter less than about 5 μm.

10. The polymer composite of claim 4, wherein the bundles have a diameter less than about 2 μm.

11. The polymer composite of claim 1, wherein the polymer composite further comprises an additional filler selected from the group consisting of calcium phosphates, strontium glass, barium glass, quartz, borosilicate glass, ceramics, silica, silicon nitride, silicon carbide, zirconia, medical grade ceramics, poly(L-lactide), poly(e-caprolactone), poly(lactide-co-glycolide), chitosan, cellulose, collagen, gelatin, and mixtures thereof.

* * * * *

UNITED STATES PATENT AND TRADEMARK OFFICE
CERTIFICATE OF CORRECTION

PATENT NO. : 9,976,011 B2  
APPLICATION NO. : 13/183221  
DATED : May 22, 2018  
INVENTOR(S) : Li et al.

Page 1 of 1

It is certified that error appears in the above-identified patent and that said Letters Patent is hereby corrected as shown below:

On the Title Page

Item (73), add additional Assignee --NANOVA INC., Columbia, Missouri--.

Signed and Sealed this
Twenty-fourth Day of July, 2018

Andrei Iancu
*Director of the United States Patent and Trademark Office*